US011649378B2

(12) United States Patent
El Hedok et al.

(10) Patent No.: US 11,649,378 B2
(45) Date of Patent: May 16, 2023

(54) INTERNAL INCORPORATION OF HYDROCARBON TACKIFIERS IN WATER-BASED (METH)ACRYLATE ADHESIVE COMPOSITIONS, REACTION MIXTURES, METHODS, AND ARTICLES

(71) Applicant: 3M INNOVATIVE PROPERTIES COMPANY, St. Paul, MN (US)

(72) Inventors: Ibrahim A. El Hedok, Woodbury, MN (US); Mahfuza B. Ali, Mendota Heights, MN (US); Claudia M. Mulvaney, Woodbury, MN (US); Elizabeth E. Johnson, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 952 days.

(21) Appl. No.: 16/465,160

(22) PCT Filed: Nov. 28, 2017

(86) PCT No.: PCT/US2017/063345
§ 371 (c)(1),
(2) Date: May 30, 2019

(87) PCT Pub. No.: WO2018/102267
PCT Pub. Date: Jun. 7, 2018

(65) Prior Publication Data

US 2019/0338164 A1 Nov. 7, 2019

Related U.S. Application Data

(60) Provisional application No. 62/429,251, filed on Dec. 2, 2016.

(51) Int. Cl.

| | |
|---|---|
| ***C09J 4/00*** | (2006.01) |
| ***C08F 2/38*** | (2006.01) |
| ***C08L 65/00*** | (2006.01) |
| ***C09J 4/06*** | (2006.01) |
| ***C09J 11/08*** | (2006.01) |
| ***C08F 220/18*** | (2006.01) |

(52) U.S. Cl.
CPC .................. *C09J 4/00* (2013.01); *C08F 2/38* (2013.01); *C08F 220/1808* (2020.02); *C08F 220/1812* (2020.02); *C08L 65/00* (2013.01); *C09J 4/06* (2013.01); *C09J 11/08* (2013.01)

(58) Field of Classification Search
CPC .................. C08F 2/38; C08F 220/1808; C08F 220/1812; C08L 65/00; C09J 4/00; C09J 4/06; C09J 11/08; C09J 133/04
See application file for complete search history.

(56) References Cited

U.S. PATENT DOCUMENTS

| | | | | |
|---|---|---|---|---|
| 4,374,883 | A | 2/1983 | Winslow | |
| 4,540,739 | A | 9/1985 | Midgley | |
| 5,013,784 | A | 5/1991 | Yang | |
| 5,164,441 | A | 11/1992 | Yang | |
| 5,623,011 | A | 4/1997 | Bernard | |
| 5,695,837 | A | 12/1997 | Everaerts | |
| 6,048,611 | A | 4/2000 | Lu | |
| 6,106,940 | A * | 8/2000 | Nielson | C08K 5/42 428/355 AC |
| 6,133,391 | A | 10/2000 | Nielson | |
| 6,710,128 | B1 | 3/2004 | Helmer | |
| 7,008,987 | B2 | 3/2006 | Okada | |
| 9,102,774 | B2 | 8/2015 | Clapper | |
| 2014/0170362 | A1 | 6/2014 | Ali | |
| 2015/0035204 | A1 | 2/2015 | Stoner | |

FOREIGN PATENT DOCUMENTS

| | | |
|---|---|---|
| WO | WO 2008-043716 | 4/2008 |
| WO | WO 2014-093375 | 6/2014 |
| WO | WO 2017-106448 | 6/2017 |
| WO | WO 2017-112386 | 6/2017 |
| WO | WO 2017-112450 | 6/2017 |

OTHER PUBLICATIONS

International Search Report for PCT International Application No. PCT/US2017/063345, dated Apr. 13, 2018, 7 pages.

* cited by examiner

*Primary Examiner* — Sanza L. McClendon
(74) *Attorney, Agent, or Firm* — Jean A. Lown

(57) ABSTRACT

Cationic or zwitterionic polymer adhesives, adhesive articles, aqueous polymerizable pre-adhesive reaction mixtures, and methods of preparation that include internal incorporation of a hydrocarbon tackifier. An aqueous polymerizable pre-adhesive reaction mixture includes one or more cationic (meth)acrylate monomers, one or more low Tg nonionic monomers having a (meth)acryloyl group, optionally one or more anionic (meth)acrylate monomers, and one or more hydrocarbon tackifiers.

15 Claims, No Drawings

INTERNAL INCORPORATION OF HYDROCARBON TACKIFIERS IN WATER-BASED (METH)ACRYLATE ADHESIVE COMPOSITIONS, REACTION MIXTURES, METHODS, AND ARTICLES

CROSS REFERENCE TO RELATED APPLICATIONS

This application is a national stage filing under 35 U.S.C. 371 of PCT/US2017/063345, filed Nov. 28, 2017, which claims the benefit of U.S. Application No. 62/429,251, filed Dec. 2, 2016, the disclosure of which is incorporated by reference in its/their entirety herein.

BACKGROUND

When applying a surface coating, such as paint or stain, to a surface, care must be taken so that the paint does not get on the surfaces adjacent to the surface to be painted. This can be accomplished by carefully painting the surface, or by masking off the area around the surface to be painted. Masking articles, such as masking tapes and adhesive masking sheets, are often used to protect the area adjacent to the surface being painted. When using such masking articles, it is generally desirable that the paint not bleed past the demarcation line defined by the edge of the masking article. In this manner, the masking article will produce a paint line between the painted surface and unpainted surface that is smooth and consistent, and precisely matches the line intended by the user. Depending on a number of factors, such as how well such masking articles are applied to the surface, the energy of the surface, and the texture of the surface to which such masking articles are applied, paint may flow beyond the edge of the masking article and under certain regions of the masking article, thereby producing an imprecise paint line.

Paints continue to be developed, particularly those that are easy to clean and/or that have low or no volatile organic compound content. Surfaces painted with such paints can provide problems for masking articles and other adhesive articles with respect to binding properties. That is, easy to clean and/or low/no VOC painted surfaces are very problematic for most (meth)acrylate-based and rubber-based masking tapes. New adhesives are needed, particularly water-based adhesive compositions.

SUMMARY

The present disclosure provides an adhesive composition that contains a cationic or zwitterionic polymer plus one or more hydrocarbon tackifiers, as well as adhesive articles, aqueous polymerizable pre-adhesive reaction mixtures, and methods of preparation of the adhesive composition. The aqueous polymerizable pre-adhesive reaction mixtures include one or more cationic (meth)acrylate monomers, one or more low Tg nonionic monomers having a (meth)acryloyl group, optionally one or more anionic (meth)acrylate monomers, and one or more hydrocarbon tackifiers.

In some embodiments, the present disclosure provides an aqueous polymerizable pre-adhesive reaction mixture that includes: water; one or more cationic (meth)acrylate monomers dissolved in the water; and a dispersed phase comprising one or more low Tg nonionic monomers having a (meth)acryloyl group and one or more hydrocarbon tackifiers. In some embodiments, the pre-adhesive reaction mixture further includes one or more anionic (meth)acrylate monomers.

In some embodiments, a polymerized product of an aqueous pre-adhesive reaction mixture as described herein is provided. The aqueous pre-adhesive reaction mixture can be referred to as an "emulsion" and the polymerized product of the aqueous pre-adhesive reaction mixture can be referred to as an "emulsion polymer" or like term. The dried polymerized product is the adhesive composition.

In some embodiments, the present disclosure provides an adhesive composition that includes a cationic or zwitterionic polymer plus one or more hydrocarbon tackifiers. In some embodiments, the adhesive composition includes 80 wt-% to 98 wt-% of a cationic or zwitterionic polymer and 2 wt-% to 20 wt-% of a hydrocarbon tackifier, based on the total weight of the cationic or zwitterionic polymer plus the hydrocarbon tackifier.

In some embodiments, the cationic or zwitterionic polymer comprises: 2 wt-% to 45 wt-%, based on the total weight of monomeric units, of one or more cationic monomeric units derived from a (meth)acrylate ester having an alkyl ammonium functionality, or a mixture of two or more thereof;

10 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof, 0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof, 0 wt-% to 10 wt-%, based on the total weight of monomeric units, of one or more crosslinking monomeric units; and 0 wt-% to 5 wt-%, based on the total weight of monomeric units, of one or more anionic monomeric units derived from acrylic acid, methacrylic acid, a carboxylate salt monomer, or a mixture of two or more thereof, wherein the amount of carboxylate salt is determined, based on the weight of the corresponding free acid.

In some embodiments, a hydrocarbon tackifier includes a hydrogenated hydrocarbon tackifier. In some embodiments, a hydrocarbon tackifier includes a C5-based hydrocarbon resin, a C9-based hydrocarbon resin, a C5/C9-based hydrocarbon resin, or a mixture thereof. In some embodiments, a hydrogenated hydrocarbon tackifier includes a hydrogenated C5-based hydrocarbon resin, a hydrogenated C9-based hydrocarbon resin, a hydrogenated C5/C9-based hydrocarbon resin, or a mixture thereof.

Also disclosed are articles, and methods of making the adhesive articles.

In some embodiments, the present disclosure provides an adhesive article that includes a support having first and second opposed major surfaces, and an adhesive composition as described herein disposed on at least a portion of at least one of the first and second opposed major surfaces.

In some embodiments, the present disclosure provides a method of making an adhesive article, the method includes: forming an aqueous polymerizable pre-adhesive reaction mixture as described herein; polymerizing the monomers in the pre-adhesive reaction mixture to form a polymerized mixture; coating the polymerized mixture onto a support to form a coated mixture; and drying the coated mixture. Adhesive articles prepared by the methods are also described herein. In certain embodiments, the article is a masking tape.

The terms "polymer" and "polymeric material" include, but are not limited to, organic copolymers, such as for example, block, graft (including starblock), random and alternating copolymers, and blends and modifications thereof. Furthermore, unless otherwise specifically limited, the term "polymer" shall include all possible geometrical configurations of the material. These configurations include, but are not limited to, isotactic, syndiotactic, and atactic symmetries. The polymers can be homopolymers, copolymers, terpolymers, etc. Copolymer is used herein to encompass polymers made from two or more different monomers, including terpolymers, tetrapolymers, etc. The term polymer and/or copolymer is used regardless of the molecular weight and includes what is sometimes referred to as an oligomer.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "room temperature" refers to ambient temperature, generally 20-22° C., unless otherwise noted.

The term "parts per hundred" or "pph" refers to parts per one hundred parts total monomers or polymer, which would be clearly understood depending on the context.

The term "(meth)acrylate" refers to monomeric acrylic or methacrylic esters of alcohols. Acrylate and methacrylate monomers are referred to collectively herein as "(meth) acrylates." Polymers described as being "(meth)acrylate-based" are polymers or copolymers prepared primarily (greater than 50 percent by weight (wt-%), greater than 60 wt-%, greater than 70 wt-%, greater than 80 wt-%, greater than 90 wt-%, greater than 95 wt-%, or 100 wt-%) from (meth)acrylate monomers and may include additional ethylenically unsaturated monomers such as various (meth) acrylamide monomers or various vinyl monomers that do not have a (meth)acryloyl group.

The term (meth)acryloyl" refers to a group of formula $CH_2{=}CR{-}(CO){-}$ where R is hydrogen or methyl.

The terms "glass transition temperature" and "Tg" are used interchangeably. Typically, Tg values are measured using Dynamic Mechanical Analysis (DMA), unless otherwise noted.

The terms "high Tg nonionic monomer" and "high Tg nonionic monomeric unit" refer to a monomer or monomeric unit that has a glass transition temperature of at least 30° C., at least 40° C., or at least 50° C. when homopolymerized.

The terms "low Tg nonionic monomer" and "low Tg nonionic monomeric unit" refer to a monomer or monomeric unit that has a glass transition temperature no greater than 20° C., no greater than 10° C., or no greater than 0° C. when homopolymerized. The glass transition temperature is often no greater than −10° C. or −20° C.

As used herein, the term "cationic polymer" or similar terms mean a polymer having at least one cationic moiety covalently bonded within a polymer chain, substantially in the absence of anionic moieties also covalently bonded within the polymer chain. The cationic moieties are suitably disposed within the polymer backbone, are pendant to the polymer backbone, or a mixture thereof. In some embodiments, there is a single cationically functional monomeric unit covalently bonded within the cationic polymer; in other embodiments, there is more than one cationic moiety covalently bonded within the cationic polymer. In some embodiments, there are one or more nonionic moieties covalently bonded within the cationic polymer. In some embodiments, the cationic moieties are randomly distributed within a polymer chain; in other embodiments, the cationic moieties are present in an alternating pattern, a blocky pattern, or another regular or semi-regular pattern within the polymer chain. The cationic polymer is typically a (meth)acrylate-based polymer.

As used herein, the term "zwitterionic polymer" or similar terms mean a polymer having at least one anionic moiety and at least one cationic moiety covalently bonded within a single polymer chain. The anionic and cationic moieties are suitably disposed within the polymer backbone, are pendant to the polymer backbone, or a mixture thereof. In some embodiments, the anionic and cationic moieties are present on the same backbone or pendant unit; in other embodiments, the anionic and cationic moieties are present on different backbone or pendant units. In some embodiments, the anionic and cationic moieties are randomly distributed within a polymer chain; in other embodiments, the anionic and cationic moieties are present in an alternating pattern, a blocky pattern, or another regular or semi-regular pattern within the polymer chain. In some embodiments, the anionic and cationic moieties are present in a 1:1 molar ratio within the polymer chain. In other embodiments, the anionic moieties are present in a molar excess relative to the cationic moieties within the polymer chain. In still other embodiments, the cationic moieties are present in a molar excess relative to the anionic moieties within the polymer chain. In some embodiments, there is a single anionically functional monomeric unit covalently bonded within the zwitterionic polymer; in other embodiments, there is more than one anionically functional monomeric units covalently bonded within the zwitterionic polymer. In some embodiments, there is a single cationically functional monomeric unit covalently bonded within the zwitterionic polymer; in other embodiments, there is more than one cationically functional monomeric unit covalently bonded within the zwitterionic polymer. In some embodiments, there are one or more nonionic moieties covalently bonded within the zwitterionic polymer. The zwitterionic polymer is typically a (meth) acrylate-based polymer.

As used herein, the terms "polymerizable" or "curable" are applied to the compounds, also called "monomers," that are polymerizable and/or crosslinkable as a result of initiation by thermal decomposition, redox reaction, or photolysis. Such compounds have at least one alpha, beta-unsaturated site (i.e., an ethylenically unsaturated site). In some embodiments, monomers having more than one alpha, beta-unsaturated site are termed "crosslinkers" but it will be understood that the term "monomer" includes, as appropriate in context, compounds having more than one such site.

As used herein, the term "adhesive composition" or like term includes (1) a cationic polymer or a zwitterionic polymer, (2) a hydrocarbon tackifier, and (3) optionally one or more additional components blended therewith, wherein the adhesive composition is typically a pressure sensitive adhesive composition.

As used herein, the term "adhesive article" means a support having an adhesive composition coated thereon. Supports are any useful material capable of having the adhesive compositions coated thereon for use in a pressure sensitive adhesive application. An adhesive article may be a masking article, though it is not a requirement that the adhesive article be used in a masking application. Adhesive articles include adhesive tapes, which can be used as a masking tape.

As used herein, the term "masking" means substantially preventing one or more liquids or liquid-borne materials from penetrating the interface of the adhesive composition and a substrate onto which an adhesive article is applied. As used herein in context with a masking application, the substrate onto which the adhesive article is applied is a "masked substrate." As used herein in context with a masking application, the portion of the substrate surface covered by the adhesive article and in contact with the adhesive composition is the "masked surface." Masking is achieved when one or more liquids or liquid-borne materials applied to the masked substrate are substantially prevented from contacting the masked surface.

As used herein, the term "substantial" or "substantially" means with relatively minor fluctuations or aberrations from the stated property, value, range of values, content, formula, and the like, and does not exclude the presence of additional materials, broader range values, and the like which do not materially affect the desired characteristics of a given composition, article, product, or method.

Herein, the terms "comprises" and "includes" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to claims of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "includes at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The present disclosure provides adhesive compositions that include a cationic or zwitterionic polymer plus a hydrocarbon tackifier. Aqueous polymerizable pre-adhesive reaction mixtures (also referred to as "aqueous pre-adhesive reaction mixtures" or "pre-adhesive reaction mixture" or "polymerizable pre-adhesive reaction mixtures" or like term) are also provided that include water, the monomer composition used to form the cationic or zwitterionic polymer, and a hydrocarbon tackifier. The monomer composition contains one or more cationic (meth)acrylate monomers, one or more low Tg nonionic monomers having a (meth)acryloyl group, and optionally one or more anionic (meth)acrylate monomers. Further, the polymerized products of the pre-adhesive reaction mixtures are provided as well as methods of preparation of the adhesive compositions are provided wherein the cationic or zwitterionic polymers are formed in the presence of the hydrocarbon tackifier.

Cationic polymers of the disclosure are copolymers including the reaction product of polymerizable monomers, in particular, one or more cationic monomers and one or more low Tg nonionic monomers having a (meth)acryloyl group. Zwitterionic polymers of the disclosure are copolymers including the reaction product of polymerizable monomers, in particular, one or more cationic monomers, one or more low Tg nonionic monomers having a (meth)acryloyl group, and one or more anionic monomers. The cationic polymers and the zwitterionic polymers are typically (meth) acrylate-based polymers.

The pre-adhesive reaction mixtures, the polymerized products of the pre-adhesive reaction mixtures, and the adhesive compositions of the present disclosure include one or more hydrocarbon tackifiers. The hydrocarbon tackifier can be referred to as being "internally incorporated," which means that the hydrocarbon tackifier is included in the polymerizable pre-adhesive reaction mixture and is present during the polymerization of the monomers used to form the cationic or zwitterionic polymer.

Tackifiers are used as rheology modifiers in polymeric adhesives to introduce more tack and better peel performance by lowering the modulus of the adhesive and increasing the overall glass transition temperature (Tg). Depending on the type of tackifier, they could also impart an advantageous surface chemistry which increases the adhesion to desired substrates. For example, hydrocarbon tackifiers have been found to increase adhesion to low surface energy substrates (LSE's), particularly polyolefins (e.g., low or high density polyethylenes, polypropylenes), polycarbonates, fluoroplastics, and engineering thermoplastics used, for example, in automobiles (e.g., bumpers).

The aqueous polymerizable pre-adhesive reaction mixtures are emulsions. The use of tackifiers in water-based emulsion polymer adhesives is generally limited to the use of dispersion-type tackifiers added after the polymerization of monomers. There are only a few commercially available dispersion tackifiers; however, they suffer from incompatibility problems (as evidenced by coagulum formation) with certain cationic and zwitterionic emulsion polymer adhesives. To overcome this problem, a mini-emulsion process can be used to make an adhesive by dissolving a tackifier with monomers to prepare adhesives; however, such processes require a high shear process step.

Surprisingly, incorporating hydrocarbon tackifiers into polymerizable pre-adhesive reaction mixtures that include cationic monomers solves the incompatibility problems. Furthermore, the resultant polymer adhesives are typically advantageous in that there are fewer problems with changing the color or sheen of a painted surface. An additional benefit of incorporating hydrocarbon tackifiers into polymerizable pre-adhesive reaction mixtures is the ability to use lower amounts of hydrocarbon tackifiers to achieve notable changes in adhesion performance, compared to typical loadings of hydrocarbon tackifiers in pre-made adhesive polymers (i.e., those in which the hydrocarbon tackifier is added after the polymerization of the monomers).

It is believed that this is because less of the hydrocarbon tackifier leaches out of the adhesive as a result of the hydrocarbon tackifier being internally incorporated within the adhesive composition. Use of the phrase "internally incorporated within the adhesive" means the hydrocarbon tackifier was present in a polymerizable pre-adhesive reaction mixture during the polymerization of the monomers to form the polymerized product of the pre-adhesive reaction mixture. Although not intending to be limiting, the hydrocarbon tackifier may be present in the adhesive composition, for example, by being bound in the adhesive polymer (the cationic or zwitterionic polymer), encapsulated or trapped in an interpenetrating network, and/or otherwise incorporated within the adhesive composition.

This internal incorporation of a hydrocarbon tackifier can be accomplished by adding the hydrocarbon tackifier to a monomer mixture that includes one or more cationic monomers, one or more low Tg nonionic monomers having a (meth)acryloyl group, and optionally one or more anionic monomers. The hydrocarbon tackifier forms a dispersed phase (i.e., droplets) with the hydrophobic (meth)acrylate monomer(s) within water plus the ionic monomer(s). Stated differently, the aqueous phase includes water, cationic monomer(s), and optional anionic monomer(s) dissolved in water, while the dispersed phase includes hydrophobic (meth)acrylate monomer(s) (the low Tg nonionic monomers) and a hydrocarbon tackifier. The resultant aqueous polymerizable pre-adhesive reaction mixture is an emulsion, which is typically an aqueous dispersion.

The internal incorporation of hydrocarbon tackifiers is also advantageous because a wider variety of such resins may be used without the problems of incompatibility of such resins in an aqueous dispersion when added after the adhesive polymer (i.e., the cationic or zwitterionic polymer) is made. For example, certain hydrocarbon tackifiers are not available commercially as aqueous dispersions. Use of such resins is limited when added to a pre-made adhesive polymer. The present disclosure can make use of such resins that are not available as an aqueous dispersion by incorporating them into a polymerizable pre-adhesive reaction mixture. Thus, a wider variety of hydrocarbon tackifiers can be used in the present disclosure, thereby providing more formulation latitude as well as greater control and tunability of properties of the final product.

Cationic Monomers

Cationic monomers include (meth)acrylate esters having an alkyl ammonium functionality such as trialkyl ammonium functionality. In some embodiments, the cationic monomer is a 2-(trialkyl ammonium)ethyl acrylate or a 2-(trialkyl ammonium)ethyl methacrylate. In such embodiments, the nature of the alkyl groups is not particularly limited; however, cost and practicality limit the number of useful and/or available monomers. In some embodiments, the 2-(trialkyl ammonium)ethyl acrylate or 2-(trialkyl ammonium)ethyl methacrylate is formed from the reaction of 2-(dimethylamino)ethyl acrylate or 2-(dimethylamino) ethyl methacrylate with an alkyl halide; in such embodiments, at least two of the three alkyl groups of the 2-(trialkyl ammonium)ethyl acrylate or 2-(trialkyl ammonium)ethyl methacrylate are methyl. In some embodiments, all three alkyl groups are methyl groups. In other embodiments, two of the three alkyl groups are methyl and the third is a linear, branched, cyclic, or alicyclic group having from 2 to 24 carbon atoms, or from 6 to 20 carbon atoms, or from 8 to 18 carbon atoms, or 16 carbon atoms. In some embodiments, the cationic monomer is a mixture of two or more of these compounds.

The anion associated with the ammonium functionality in such cationic monomers is not particularly limited, and many anions are useful in connection with various embodiments of the disclosure. In some embodiments, the anion is a halide anion, such as chloride, bromide, fluoride, or iodide; in some such embodiments, the anion is chloride. In other embodiments, the anion is $BF_4^-$, $N(SO_2CF_3)_2^-$, $O_3SCF_3^-$, or $O_3SC_4F_9^-$. In other embodiments, the anion is methyl sulfate. In still other embodiments, the anion is hydroxide. In some embodiments, the one or more cationic monomers includes a mixture of two or more of these anions.

In some embodiments, the cationic monomer(s) are present in the pre-adhesive reaction mixture in an amount of at least 2 weight percent (wt-%), or at least 4 wt-%, or at least 6 wt-%, or at least 7 wt-%, based on the total weight of the monomers in the pre-adhesive reaction mixture. In some embodiments, the cationic monomer(s) are present in the pre-adhesive reaction mixture in an amount of up to 45 wt-%, or up to 40 wt-%, or up to 35 wt-%, or up to 25 wt-%, or up to 15 wt-%, or up to 10 wt-%, based on the total weight of the monomers in the pre-adhesive reaction mixture. Various intermediate levels are also possible, such as 3 wt-%, 5 wt-%, 6 wt-%, 8 wt-%, and all other such individual values represented by, for example, 1 wt-% increments between 2 wt-% and 45 wt-%, and in any range spanning these individual values in, for example, 1 wt-% increments, such as 2 wt-% to 4 wt-%, 7 wt-% to 38 wt-%, 20 wt-% to 25 wt-%, and the like. These amounts also apply to the amounts of reacted monomeric units in a cationic or zwitterionic polymer of the present disclosure, wherein the weight percentages are based on the weight of the polymer.

The cationic monomer is typically dissolved in the water included in the aqueous polymerizable pre-adhesive reaction mixture.

Low Tg Nonionic Monomers Having a (Meth)Acryloyl Group

Suitable low Tg nonionic monomers are those with a (meth)acryloyl group (i.e., a single (meth)acryloyl group). These monomers are typically alkyl (meth)acrylates. More specifically, they are often alkyl (meth)acrylates having a non-tertiary alkyl group with 1 to 18 carbon atoms. For example, the non-tertiary alkyl (meth)acrylates having an alkyl group typically have at least 1 carbon atom, at least 2 carbon atoms, at least 3 carbon atoms, at least 4 carbon atoms, at least 6 carbon atoms, at least 8 carbon atoms and up to 18 carbon atoms, up to 16 carbon atoms, up to 14 carbon atoms, up to 12 carbon atoms, or up to 10 carbon atoms. More particularly, the alkyl group can have 2 to 18 carbon atoms, 4 to 18 carbon atoms, 6 to 18 carbon atoms, 8 to 18 carbon atoms, 10 to 18 carbon atoms, 8 to 16 carbon atoms, or 8 to 14 carbon atoms. Isomer blends can be used. These monomers are often added to lower the glass transition temperature of the cationic or zwitterionic polymer so that it functions as a pressure sensitive adhesive. The low Tg nonionic monomers typically are not soluble in water or have very limited solubility in water.

Specific examples of low Tg nonionic monomers having a (meth)acryloyl group include, but are not limited to, methyl acrylate, ethyl acrylate, n-propyl acrylate, n-butyl acrylate, n-butyl methacrylate, isobutyl acrylate, sec-butyl acrylate, n-pentyl acrylate, 2-methylbutyl acrylate, n-hexyl acrylate, cyclohexyl acrylate, 4-methyl-2-pentyl acrylate, 2-methylhexyl acrylate, 2-ethylhexyl acrylate, n-octyl acrylate, 2-octyl acrylate, isooctyl acrylate, isononyl acrylate, isoamyl acrylate, n-decyl acrylate, isodecyl acrylate, n-decyl methacrylate, dodecyl acrylate, tridecyl acrylate, n-octadecyl acrylate, isostearyl acrylate, and n-dodecyl methacrylate. Isomers and/or isomer blends of these alkyl (meth) acrylates can often be used.

In some embodiments, the low Tg nonionic monomers having a (meth)acryloyl group are present in the pre-adhesive reaction mixture in an amount of at least 10 wt-%, at least 20 wt-%, at least 25 wt-%, at least 30 wt-%, at least 35 wt-%, at least 40 wt-%, at least 45 wt-%, at least 50 wt-%, at least 55 wt-%. at least 60 wt-%, at least 65 wt-%, at least 70 wt-%, at least 75 wt-%, or at least 80 wt-%, based on a total weight of monomers in the pre-adhesive reaction mixture. In some embodiments, the low Tg nonionic monomers having a (meth)acryloyl group are present in the pre-adhesive reaction mixture in an amount of up to 98 wt-%, up to 95 wt-%, up to 90 wt-%, or up to 85 wt-%, based on a total weight of monomers in the pre-adhesive reaction mixture. These amounts also apply to the amounts of reacted monomeric units in a cationic or zwitterionic polymer of the present disclosure, wherein the weight percentages are based on the weight of the polymer.

Anionic Monomers

For preparation of zwitterionic polymers, anionic monomers are included in the polymerizable pre-adhesive reaction mixture.

Anionic monomers include, but are not limited to, acrylic acid, methacrylic acid, a salt thereof, or a mixture thereof. In some embodiments, the anionic monomers include acrylic acid, methacrylic acid, a carboxylate salt thereof, or a mixture of two or more thereof, wherein the amount of carboxylate salt is determined based on the weight of the corresponding free acid.

Other anionic monomers include itaconic acid, maleic acid, beta-carboxyethyl acrylate, sulfoethyl (meth)acrylate, sulfopropyl (meth)acrylate, vinyl phosphoric acid, and 2-acrylamido-2-methylpropane sulfonic acid, and salts thereof.

Anionic monomers are not used in making purely cationic polymers. Thus, in certain embodiments, the amount present in the pre-adhesive reaction mixture can be 0 to 5 wt-%, based on the total weight of the monomers in the pre-adhesive reaction mixture.

When the anionic monomers are present in making zwitterionic polymers, in some embodiments, the anionic monomer(s) are present in the pre-adhesive reaction mixture in an amount of at least 0.2 wt-%, or at least 0.5 wt-%, based on the total weight of the monomers in the pre-adhesive reaction mixture. In some embodiments, the anionic monomer(s) are present in the pre-adhesive reaction mixture in an amount of up to 5 wt-%, based on the total weight of the monomers in the pre-adhesive reaction mixture. Various intermediate levels are also possible, such as 0.3 wt-%, 0.4 wt-%, 0.6 wt-%, 0.7 wt-%, and all other such individual values represented by, for example, 0.1 wt-% increments between 0.2 and 5 wt-%, and in any range spanning these individual values in, for example, 0.1 wt-% increments, such as 0.2 wt-% to 0.9 wt-%, 1.2 wt-% to 3.1 wt-%, and the like. These amounts also apply to the amounts of reacted monomeric units in a zwitterionic polymer of the present disclosure, wherein the weight percentages are based on the weight of the polymer.

The anionic monomer is typically dissolved in the water along with the cationic monomer included in the polymerizable pre-adhesive reaction mixture.

Additional Optional Monomers

In some embodiments, the aqueous polymerizable pre-adhesive reaction mixtures may include one or more additional monomers. Such additional monomers are not particularly limited by structure, but are selected to impart to the resulting polymer (cationic or zwitterionic) various desirable properties. For cationic polymers, it is understood that such additional optional monomers are not anionic.

In some embodiments, the additional monomer(s) are selected to provide a reduced level of measurable adhesion to a selected substrate while still providing the level of tack of the adhesive polymer (i.e., the cationic or zwitterionic polymer), relative to the adhesive polymer without the one or more additional monomers. In other embodiments, the additional monomer(s) are selected to impart to the resulting adhesive polymer with a reduced level of tack while maintaining a substantially constant level of adhesion to a selected substrate, relative to the polymer without the one or more additional monomers. In still other embodiments, the additional monomer(s) are selected to impart to the resulting adhesive polymer an increased level of tack while maintaining a substantially constant level of adhesion to a selected substrate relative to the adhesive polymer without the one or more additional monomers.

In many embodiments, the additional optional monomers are selected from a) one or more high Tg nonionic monomers having a (meth)acryloyl group (i.e., a single (meth) acryloyl group), b) one or more polar monomers having a polar group that is a hydroxyl group, primary amido group, secondary amido group, a tertiary amido group, an amino group, an ether group, or an epoxy group, c) one or more vinyl monomers that are free of a (meth)acryloyl group, or d) a mixture of two or more thereof.

In many embodiments, the optional additional monomers include one or more high Tg nonionic monomers having a (meth)acryloyl group. When used in combination with one or more hydrocarbon tackifiers described herein, such high Tg nonionic monomers have been found to increase adhesion to low surface energy substrates (LSE's), particularly polyolefins (e.g., low or high density polyethylenes, polypropylenes), polycarbonates, fluoroplastics, and engineering thermoplastics used, for example, in automobiles (e.g., bumpers), as well as other surfaces, such as glass.

Example high Tg nonionic monomers having a single (meth)acryloyl group include, but are not limited to, methyl methacrylate, ethyl methacrylate, n-propyl methacrylate, isopropyl methacrylate, n-butyl methacrylate, isobutyl methacrylate, sec-butyl methacrylate, tert-butyl (meth)acrylate, cyclohexyl methacrylate, isobornyl (meth)acrylate, stearyl (meth)acrylate, phenyl acrylate, benzyl methacrylate, 3,3,5 trimethylcyclohexyl (meth)acrylate, 2-phenoxyethyl methacrylate, and mixtures thereof.

The optional polar monomers are not the anionic monomer or cationic monomers described above. Rather, the polar monomers have a polar group that is a hydroxyl group, primary amido group, secondary amido group, a tertiary amido group, an amino group, an ether group, or an epoxy group. One or more different polar monomers can be used.

Example polar monomers having a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), hydroxyalkyl (meth)acrylamides (e.g., hydroxymethyl (meth)acrylamide, 2-hydroxyethyl (meth)acrylamide, 3-hydroxypropyl (meth) acrylamide), ethoxylated hydroxyethyl (meth)acrylate (e.g., monomers commercially available from Sartomer (Exton, Pa., USA) under the trade designation CD570, CD571, and CD572), and aryloxy substituted hydroxyalkyl (meth)acrylates (e.g., 2-hydroxy-2-phenoxypropyl (meth)acrylate).

Example polar monomers with a primary amido group include (meth)acrylamide.

Example polar monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth) acrylamide, N-octyl (meth)acrylamide, and diacetone (meth)acrylamide.

Example polar monomers with a tertiary amido group include caprolactam, N-vinyl-2-pyrrolidone, (meth)acryloyl morpholine, and N,N-dialkyl (meth)acrylamides such as N,N-dimethyl (meth)acrylamide, N,N-diethyl (meth)acrylamide, N,N-dipropyl (meth)acrylamide, and N,N-dibutyl (meth)acrylamide.

Example polar monomers with an amino group include various N,N-dialkylaminoalkyl (meth)acrylates and N,N-dialkylaminoalkyl (meth)acrylamides. Examples include, but are not limited to, N,N-dimethyl aminoethyl (meth) acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth) acrylate, N,N-diethylaminoethyl (meth)acrylamide, N,N-diethylaminopropyl (meth)acrylate, and N,N-diethylaminopropyl (meth)acrylamide.

Example polar monomers with an epoxy group would include glycidyl (meth)acrylate.

Example polar monomers with an ether group would include 2-methoxyethyl acrylate and methoxy polyethylene glycol (meth)acrylate.

Optional vinyl monomers are monomers that do not have a (meth)acryloyl group. Vinyl monomers having a polar group characteristic of polar monomers are considered herein to be polar monomers. Example vinyl monomers include, but are not limited to, acrylonitrile, various vinyl ethers (e.g., vinyl methyl ether), vinyl esters (e.g., vinyl acetate and vinyl propionate), styrene, substituted styrene (e.g., α-methyl styrene), vinyl halide, and mixtures thereof.

In some embodiments, the one or more additional optional monomers, particularly one or more high Tg nonionic monomers having a (meth)acryloyl group, may be present in a pre-adhesive reaction mixture in an amount of greater than 0 wt-%, or at least 1 wt-%, or at least 2 wt-%, or at least 3 wt-%, or at least 5 wt-%, based on the total weight of the monomers in the pre-adhesive reaction mixture. In some embodiments, the one or more additional monomers may be present in a pre-adhesive reaction mixture in an amount of up to 30 wt-%, or up to 20 wt-%, or up to 15 wt-%, or up to 10 wt-%, based on the total weight of the monomers in the pre-adhesive reaction mixture. Various intermediate levels are also possible, such as 1 wt-%, 3 wt-%, 4 wt-%, 5 wt-%, 6 wt-%, 7 wt-%, and all other such individual values represented by, for example, 1 wt-% increments between 0 wt-% and 30 wt-%, and in any range spanning these individual values in, for example, 1 wt-% increments, such as 2 wt-% to 4 wt-%, 11 wt-% to 28 wt-%, 7 wt-% to 17 wt-%, and the like. These amounts also apply to the amounts of reacted monomeric units in a cationic or zwitterionic polymer of the present disclosure, wherein the weight percentages are based on the weight of the polymer.

Depending on the solubility of these monomers in water, the optional additional monomers can be dissolved in water, dispersed in water, or both.

Optional Crosslinking Monomers

In some embodiments, the polymerizable pre-adhesive reaction mixture includes an additional monomer having two or more polymerizable functionalities; such monomers are referred to as crosslinkers. Crosslinkers that are useful in forming the cationic or zwitterionic polymer include, without limitation, diacrylates such as ethylene glycol diacrylate, hexanediol diacrylate, and tripropyleneglycol diacrylate; triacrylates such as glycerol triacrylate and trimethylolpropane triacrylate; tetraacrylates such as erythritol tetraacrylate and pentaerythritol tetraacrylate; divinyl benzene and derivatives thereof; and the like. In some embodiments, the crosslinker is a photoactive crosslinker. Photoactive crosslinkers include, for example, benzaldehyde, acetaldehyde, anthraquinone, substituted anthraquinones, various benzophenone-type compounds such as copolymerizable benzophenones (e.g., acryloyl benzophenone (ABP)), and certain chromophore-substituted vinylhalomethyl-1,3-triazines such as 2,4-bis(trichloromethyl)-6-p-methoxystyryl-1,3-triazine.

In some embodiments, one or more crosslinkers (i.e., crosslinking monomers), as an additional monomer, are present in a pre-adhesive reaction mixture in an amount of up to 10 wt-%, up to 5 wt-%, or up to 2 wt-%, based on the total weight of the monomers in the pre-adhesive reaction mixture. In some embodiments, the one or more crosslinkers are present in a pre-adhesive reaction mixture in an amount of greater than 0 wt-%, at least 0.1 wt-%, at least 0.5 wt-%, or at least 1.0 wt-% based on the total weight of the monomers in the pre-adhesive reaction mixture. These amounts also apply to the amounts of reacted monomers used to form the cationic or zwitterionic polymer, wherein the weight percentages are based on the weight of the polymer.

Overall Monomer Compositions in Pre-Adhesive Reaction Mixtures

In some embodiments, the cationic or zwitterionic polymer is formed from the following monomer composition:

2 wt-% to 45 wt-%, based on the total weight of monomers, of one or more cationic monomers comprising a (meth)acrylate ester having an alkyl ammonium functionality;

10 wt-% to 98 wt-%, based on the total weight of monomers, of one or more low Tg nonionic monomers having a (meth)acryloyl group and having a Tg of no more than 20° C. when homopolymerized;

0 wt-% to 30 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof;

0 wt-% to 10 wt-%, based on the total weight of monomers, of one or more crosslinking monomers; and 0 wt-% to 5 wt-%, based on the total weight of monomers, of one or more anionic monomers comprising acrylic acid, methacrylic acid, a carboxylate salt monomer, or a mixture of two or more thereof, wherein the amount of carboxylate salt is determined based on the weight of the corresponding free acid.

In some example embodiments, the cationic or zwitterionic polymer is formed from the following monomer composition:

2 wt-% to 20 wt-%, based on the total weight of monomers, of one or more cationic monomers comprising a (meth)acrylate ester having an alkyl ammonium functionality;

45 wt-% to 98 wt-%, based on the total weight of monomers, of one or more low Tg nonionic monomers having a (meth)acryloyl group and having a Tg of no more than 20° C. when homopolymerized;

0 wt-% to 20 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof;

0 wt-% to 10 wt-%, based on the total weight of monomers, of one or more crosslinking monomers; and 0 wt-% to 5 wt-%, based on the total weight of monomers, of one or more anionic monomers comprising acrylic acid, methacrylic acid, a carboxylate salt thereof, or a mixture of two or more thereof, wherein the amount of carboxylate salt is determined based on the weight of the corresponding free acid.

In other example embodiments, the cationic or zwitterionic polymer is formed from the following monomer composition:

5 wt-% to 20 wt-%, based on the total weight of monomers, of one or more cationic monomers comprising a (meth)acrylate ester having an alkyl ammonium functionality;

60 wt-% to 95 wt-%, based on the total weight of monomers, of one or more low Tg nonionic monomers having a (meth)acryloyl group and having a Tg of no more than 20° C. when homopolymerized;

0 wt-% to 10 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof;

0 wt-% to 5 wt-%, based on the total weight of monomers, of one or more crosslinking monomers; and 0 wt-% to 5 wt-%, based on the total weight of monomers, of one or more anionic monomers comprising acrylic acid, methacrylic acid, a carboxylate salt thereof, or a mixture of two or more thereof, wherein the amount of carboxylate salt is determined based on the weight of the corresponding free acid.

In still other example embodiments, the cationic or zwitterionic polymer is formed from the following monomer composition:

5 wt-% to 15 wt-%, based on the total weight of monomers, of one or more cationic monomers comprising a (meth)acrylate ester having an alkyl ammonium functionality;

65 wt-% to 95 wt-%, based on the total weight of monomers, of one or more low Tg nonionic monomers having a (meth)acryloyl group and having a Tg of no more than 20° C. when homopolymerized;

0 wt-% to 10 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof;

0 wt-% to 5 wt-%, based on the total weight of monomers, of one or more crosslinking monomers; and 0 wt-% to 5 wt-%, based on the total weight of monomers, of one or more anionic monomers comprising acrylic acid, methacrylic acid, a carboxylate salt thereof, or a mixture of two or more thereof, wherein the amount of carboxylate salt is determined based on the weight of the corresponding free acid.

In still other example embodiments, the cationic or zwitterionic polymer is formed from the following monomer composition:

2 wt-% to 20 wt-%, based on the total weight of the monomers, of one or more cationic monomers comprising a (meth)acrylate ester having an alkyl ammonium functionality;

45 wt-% to 98 wt-%, based on the total weight of monomers, of one or more low Tg nonionic monomers having a (meth)acryloyl group and having a Tg of no more than 20° C. when homopolymerized;

0 wt-% to 30 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof;

0 wt-% to 5 wt-%, based on the total weight of the monomers, of one or more anionic monomers comprising acrylic acid, methacrylic acid, a carboxylate salt thereof, or a mixture of two or more thereof, wherein the amount of carboxylate salt is determined based on the weight of the corresponding free acid.

Hydrocarbon Tackifiers

Tackifiers that are hydrocarbon resins can be prepared from various petroleum-based feed stocks. There feedstocks can be aliphatic hydrocarbons (mainly C5 monomers with some other monomers present such as a mixture of trans-1, 3-pentadiene, cis-1,3-pentadiene, 2-methyl-2-butene, dicyclopentadiene, cyclopentadiene, and cyclopentene), aromatic hydrocarbons (mainly C9 monomers with some other monomers present such as a mixture of vinyl toluenes, dicyclopenetadiene, indene, methylstyrene, styrene, and methylindenes), or mixtures thereof. Tackifiers derived from C5 monomers are referred to as C5-based hydrocarbon resins, while those derived from C9 monomers are referred to as C9-based hydrocarbon resins. Some tackifiers are derived from a mixture of C5 and C9 monomers or are a blend of C5-based hydrocarbon tackifiers and C9-based hydrocarbon tackifiers. These tackifiers can be referred to as C5/C9-based hydrocarbon tackifiers. Any of these resins can be partially or fully hydrogenated to improve their color and thermal stability.

In certain embodiments, the hydrocarbon tackifiers include hydrogenated hydrocarbon tackifiers. In certain embodiments, hydrogenated hydrocarbon tackifiers include a hydrogenated terpene resin, a hydrogenated rosin resin, a hydrogenated C5-based hydrocarbon resin, a hydrogenated C9-based hydrocarbon resin, a hydrogenated C5/C9-based hydrocarbon resin, or a mixture of two or more thereof.

Exemplary C5-based hydrocarbon tackifiers are commercially available from Eastman Chemical Company under the trade designations PICCOTAC and EASTOTAC, from Cray Valley under the trade designation WINGTACK, from Neville Chemical Company under the trade designation NEVTAC LX, and from Kolon Industries, Inc. under the trade designation HIKOREZ. The C5-based hydrocarbon resins are commercially available from Eastman Chemical with various degrees of hydrogenation under the trade designation EASTOTACK.

Exemplary C9-based hydrocarbon tackifiers are commercially available from Eastman Chemical Company under the trade designation PICCO, KRISTALEX, PLASTOLYN, PICCOTAC, and ENDEX, from Cray Valley (Exton, Pa., USA) under the trade designations NORSOLENE, from Rutgers (The Netherlands) under the trade designation NOVAREZ, and from Kolon Industries, Inc. (South Korea) under the trade designation HIKOTAC. These resins can be partially or fully hydrogenated.

Hydrogenated C9-based hydrocarbon tackifiers are derived mainly from C9 monomers with some other monomers present such as a mixture of vinyl toluenes, dicyclopenadiene, indene, methylstyrene, styrene, and methylindenes. In some embodiments, prior to hydrogenation, the C9-based hydrocarbon resins are often 40 percent aromatic as measured by proton Nuclear Magnetic Resonance. Hydrogenated C9-based hydrocarbon resins are commercially available, for example, from Eastman Chemical under the trade designations REGALITE and REGALREZ that are 50 to 100 percent (e.g., 50 percent, 60 percent, 70 percent, 90 percent, and 100 percent) hydrogenated. Hydrogenated hydrocarbon tackifiers are also available from Arakawa Chemical (USA) Inc. (Chicago, Ill., USA) under the trade designation ARKON (e.g., the P-type are fully hydrogenated and the M-type are partially hydrogenated). The partially hydrogenated resins typically have some aromatic rings. In some embodiments, the hydrogenated hydrocarbon tackifier is fully hydrogenated. An example of such a tackifier is REGALREZ 1126.

Various C5/C9-based hydrocarbon tackifiers are commercially available from Arakawa under the trade designation ARKON, from Zeon under the trade designation QUINTONE, from Exxon Mobile Chemical under the trade designation ESCOREZ, and from Newport Industries under the trade designations NURES and H-REZ.

The inclusion of a hydrocarbon tackifier can provide enhanced adhesion to at least some architectural coatings (e.g., various durable and dirt resistant paints). Due to the wide variety of architectural coating compositions, such enhancement may not necessarily occur to the same degree for every architectural coating (alternatively phrased, different levels of hydrocarbon tackifiers, and/or hydrocarbon tackifiers of different composition, may be optimum for use with different architectural coatings).

In some embodiments, the hydrocarbon tackifier is present in the pre-adhesive reaction mixture in an amount of at least 2 parts per one hundred parts of total monomers (pph), at least 3 pph, at least 4 pph, or at least 5 pph. In some embodiments, the hydrocarbon tackifier is present in the reaction mixture in an amount of up to 25 pph, up to 20 pph, up to 15 pph, or up to 10 pph. Various intermediate levels are also possible, such as 3 pph, 6 pph, 7 pph, and all other such individual values represented by, for example, 1 pph increments between 2 pph and 20 pph, and in any range spanning these individual values in, for example, 1 pph increments, such as 2 pph to 4 pph, or 11 pph to 20 pph, or 5 pph to 10 pph, and the like.

Polymerization Processes

The polymerization of the cationic and zwitterionic polymers are carried out using conventional thermal polymerization techniques familiar to those of skill.

In the case of emulsion polymerization, water-soluble initiators are preferred. In some embodiments where thermal decomposition is employed to initiate polymerization, emulsion polymerization of the monomers employed to make the cationic or zwitterionic polymers of the disclosure is carried out by blending the monomers, hydrocarbon tackifier(s), and a thermal initiator in water, followed by heating the emulsion to a temperature wherein decomposition of the initiator occurs at a rate suitable to sustain a suitable rate of polymerization. Non-limiting examples of suitable thermal initiators include any of the organic peroxides or azo compounds conventionally employed by those skilled in the art of thermal initiation of polymerization, such a dicumyl peroxide, benzoyl peroxide, or 2,2'-azo-bis(isobutyronitrile) (AIBN), and thermal initiators sold under the trade name VAZO by DuPont USA of Wilmington, Del. In the case of emulsion polymerization, water-soluble initiators are preferred. The amount of initiator is typically in a range of 0.05 to 2 wt-%, or in a range of 0.1 to 1 wt-%, or in a range of 0.1 to 0.5 wt-%, based on the total weight of monomers.

The pre-adhesive reaction mixture often contains a chain transfer agent to control the molecular weight of the resulting cationic or zwitterionic monomer. Exemplary chain transfer agents include, but are not limited to, carbon tetrabromide, carbon tetrachloride, mercaptans such as tert-dodecyl mercaptan, n-dodecyl mercaptan, n-octyl mercaptan, 1,8-dimercapto-3,6-dioxaoctane, 2-mercaptoethanol, trimethylolpropane tris(3-mercapto propionate), pentaerythritol tetra(3-mercapto propionate), 3-mercaptoproprionic acid, isooctyl 3-mercapto propionate, and a mixture of two or more thereof.

When used in combination with hydrocarbon tackifiers, chain transfer agents have been found to increase adhesion to low surface energy substrates (LSE's), particularly polyolefins (e.g., low or high density polyethylenes, polypropylenes), polycarbonates, fluoroplastics, and engineering thermoplastics used, for example, in automobiles (e.g., bumpers), as well as other substrates.

In some embodiments, the amount of the chain transfer agent is present in the pre-adhesive reaction mixture in an amount of at least 0.005 part per one hundred parts total monomers (pph), or at least 0.01 pph, or at least 0.02 pph. In some embodiments, the amount of the chain transfer agent is present in the pre-adhesive reaction mixture in an amount of up to 0.5 pph, or up to 0.1 pph.

In some embodiments, the monomers and hydrocarbon tackifier(s) are admixed, coated onto a tape backing or other support, and heated to initiate polymerization. In some such embodiments, air is partially excluded or limited in the reaction area during the polymerization.

In some embodiments, one or more additional monomers, crosslinkers, initiators, chain transfer agents, or a combination thereof are then added to the pre-polymerized mixture of monomers and hydrocarbon tackifier(s). In some embodiments, the one or more additional monomers, crosslinkers, initiators, chain transfer agents, or combination thereof include some or all of the same compounds, present in the same ratios, as those added to the mixture that is pre-polymerized. The pre-polymerized mixture is then coated onto the support and cured, wherein the viscosity of the pre-polymerized mixture allows a thicker layer to be coated than would be practicable by coating without pre-polymerization.

In other embodiments, an emulsion of monomers and hydrocarbon tackifier(s) is formed and polymerization is carried out using thermal initiation of the polymerization reaction. The emulsion is a water-in-oil or an oil-in-water emulsion. In some such embodiments, the emulsion is an oil-in-water emulsion, wherein the one or more monomers are stabilized in a bulk water phase by employing one or more surfactants. In various embodiments, the surfactant is cationic, zwitterionic, or nonionic in nature and the structure thereof not otherwise particularly limited. In some embodiments, the surfactant is also a monomer and becomes incorporated within the cationic or zwitterionic polymer molecules. In other embodiments, the surfactant is present in the polymerization reaction vessel but is not incorporated into the cationic or zwitterionic polymer as a result of the polymerization reaction.

Non-limiting examples of nonionic surfactants useful in forming oil-in-water emulsions of the monomers and hydrocarbon tackifier(s) employed to form a cationic or zwitterionic polymer include block copolymers of ethylene oxide and propylene oxide, such as those sold under the trade names PLURONIC, KOLLIPHOR, or TETRONIC, by the BASF Corporation of Charlotte, N.C., USA; ethoxylates formed by the reaction of ethylene oxide with a fatty alcohol, nonylphenol, dodecyl alcohol, and the like, including those sold under the trade name TRITON, by the Dow Chemical Company of Midland, Mich., USA; oleyl alcohol; sorbitan esters; alkylpolyglycosides such as decyl glucoside; sorbitan tristearate; and combinations of one or more thereof.

Non-limiting examples of cationic surfactants useful in forming oil-in-water emulsions of the monomers and hydrocarbon tackifier(s) employed to form a cationic or zwitterionic polymer include cocoalkylmethyl[polyoxyethylene (15)] ammonium chloride, benzalkonium chloride, cetrimonium bromide, demethyldioctadecylammonium chloride, lauryl methyl gluceth-10 hydroxypropyl diammonium chloride, tetramethylammonium hydroxide, monoalkyltrimethylammonium chlorides, monoalkyldimethylbenzylammonium chlorides, dialkylethylmethylammonium ethosulfates, trialkylmethylammonium chlorides, polyoxyethylenemonoalkylmethylammonium chlorides, and diquaternaryammonium chlorides; the ammonium functional surfactants sold by Akzo Nobel N.V. of Amsterdam, the Netherlands, under the trade names ETHOQUAD, ARQUAD, and DUOQUAD; and mixtures thereof. Of particular use in forming oil-in-water emulsions for polymerization of the zwitterionic polymers of the disclosure are the ETHOQUAD surfactants, for example, ETHOQUAD C/12, C/25, C/12-75, and the like. In some embodiments, ETHOQUAD C/25 is usefully employed to make high solids emulsions in water of the monomers employed to make the zwitterionic polymers of the disclosure.

In some embodiments, where a cationic surfactant is employed in an oil-in-water emulsion polymerization reaction, it is employed in an amount of at least 0.1 wt-%, or at least 0.2 wt-%, or at least 0.5 wt-%, or at least 1.0 wt-%, or at least 2.0 wt-%, based on the total weight of the monomers in the pre-adhesive reaction mixture. In some embodiments where a cationic surfactant is employed in an oil-in-water emulsion polymerization reaction, it is employed in an amount of up to 6.0 wt-%, or up to 4.0 wt-%, based on the total weight of the monomers in the pre-adhesive reaction mixture. Various intermediate levels are also useful, such as 1.1 wt-%, 1.2 wt-%, 1.3 wt-%, 1.4 wt-%, 1.5 wt-%, 1.6 wt-%, 1.7 wt-%, 1.8 wt-%, 1.9 wt-%, 2.1 wt-%, 2.2 wt-%, and all other such individual values represented by, for example, 0.1 wt-% increments between 0.1 and 6.0 wt-%, and in any range spanning these individual values in, for example, 0.1 wt-% increments, such as 2.3 wt-% to 4.6 wt-%, 4.5 wt-% to 4.7 wt-%, and the like.

Non-limiting examples of zwitterionic surfactants useful in forming oil-in-water emulsions of the monomers employed to form the cationic or zwitterionic polymers include betaines and sultaines, such as cocamidopropyl betaine, hydroxysultaine, and cocamidopropyl hydroxysultaine; others include lecithin, 3[(3-cholamidopropyl)dimethylammonio]-1-propanesulfonate (CHAPS), and sodium 2-[1-(2-hydroxyethyl)-2-undecyl-4,5-dihydroimidazol-1-ium-1-yl]acetate (sodium lauroamphoacetate).

In some embodiments, where a zwitterionic surfactant is employed in an oil-in-water emulsion polymerization reaction, it is employed in an amount of at least 1.0 wt-%, or at least 2.0 wt-%, based on the total weight of the monomers in the pre-adhesive reaction mixture. In some embodiments, where a zwitterionic surfactant is employed in an oil-in-water emulsion polymerization reaction, it is employed in an amount of up to 10.0 wt-%, or up to 6.0 wt-%, based on the total weight of the monomers in the pre-adhesive reaction mixture. Various intermediate levels are also useful, such as 1.1 wt-%, 1.2 wt-%, 1.3 wt-%, 1.4 wt-%, 1.5 wt-%, 1.6 wt-%, 1.7 wt-%, 1.8 wt-%, 1.9 wt-%, 2.1 wt-%, 2.2 wt-%, and all other such individual values represented by, for example, 0.1 wt-% increments between 1.0 and 10.0 wt-%, and in any range spanning these individual values in, for example, 0.1 wt-% increments, such as 2.3 wt-% to 4.6 wt-%, 4.5 wt-% to 4.7 wt-%, and the like.

In other embodiments, emulsion polymerization of the monomers and hydrocarbon tackifier(s) employed to make a cationic or zwitterionic polymer of the disclosure is carried out by blending the monomers, and hydrocarbon tackifier(s), surfactant(s), and a thermal initiator in water, followed by heating the emulsion to a temperature where decomposition of the thermal initiator is induced at a suitable rate.

In some embodiments where methacrylic acid or acrylic acid are employed in the monomer mixture, sodium, lithium, ammonium, or potassium hydroxide is added to the monomer mixture to neutralize the acid functionality and form the corresponding salt. In other embodiments, such neutralization is carried out after completion of the polymerization reaction. Neutralization, in embodiments, means adjusting the pH of the water phase from 2 to 3 to 4 to 7, for example, 5 to 6.

In some embodiments, ETHOQUAD C/25, which is cocoalkylmethyl[polyoxyethylene (15)] ammonium chloride, is usefully employed to make high solids emulsions of the monomers and hydrocarbon tackifier(s). In this context, "solids" are defined as all ingredients of the emulsion other than water.

In some embodiments, high solids emulsions are formed, for example, at a solids content of at least 15 wt-%, or at least 25 wt-%, or at least 30 wt-%, solids in water. In some embodiments, high solids emulsions are formed, for example, at a solids content of up to 60 wt-%, or up to 50 wt-%, solids in water. Various intermediate levels are useful, such as 16 wt-%, 17 wt-%, 18 wt-%, 19 wt-%, 20 wt-%, 21 wt-%, 22 wt-%, 23 wt-%, 24 wt-%, 26 wt-%, 27 wt-%, and all other such individual values represented by, for example, 1 wt-% increments between 15 wt-% and 60 wt-% solids in water, and in any range spanning these individual values in, for example, 1 wt-% increments, such as 23 wt-% to 46 wt-%, 45 wt-% to 57 wt-%, and the like.

In some embodiments, water is present in the polymerizable pre-adhesive reaction mixture, for example, in an amount of at least 40 wt-%, or at least 45 wt-%, or at least 50 wt-%. In some embodiments, water is present in the polymerizable pre-adhesive reaction mixture, for example, in an amount of up to 85 wt-%, or up to 75 wt-%, or up to 70 wt-%, or up to 60 wt-%.

In general, conditions of emulsion polymerization and methodology employed are the same or similar to those employed in conventional emulsion polymerization methods. In some embodiments, the oil-in-water emulsion polymerization is carried out using thermal initiation. In such embodiments, one useful polymerization initiator is V-50, which is a water-soluble cationic azo initiator (obtained from Wako Pure Chemical Industries Ltd. of Osaka, Japan). In some such embodiments, the temperature of the emulsion is adjusted prior to and during the polymerization to 30° C. to 100° C., or 40° C. to 80° C., or 40° C. to 60° C., or to 45° C. to 55° C.

Agitation of the emulsion at elevated temperature is carried out for a suitable amount of time to decompose substantially all of the thermal initiator, and react substantially all of the monomers added to the emulsion to form a polymerized emulsion. In some embodiments, elevated temperature is maintained for a period of 2 hours to 24 hours, or 4 hours to 18 hours, or 8 hours to 16 hours.

During polymerization, it is necessary in some embodiments to add additional thermal initiator to complete the reaction of substantially all of the monomer content added to the reaction vessel. It will be appreciated that completion of the polymerization is achieved by careful adjustment of conditions, and standard analytical techniques, such as gas chromatographic analysis of residual monomer content, will inform the skilled artisan regarding the completion of polymerization.

In other embodiments, the polymerization occurs in an aqueous mixture that may also include an organic solvent. Examples of suitable organic solvents and solvent mixtures include, in various embodiments, one or more of ethanol, methanol, toluene, methyl ethyl ketone, ethyl acetate, isopropyl alcohol, tetrahydrofuran, 1-methyl-2-pyrrolidinone, 2-butanone, acetonitrile, dimethylformamide, dimethyl sulfoxide, dimethylacetamide, dichloromethane, t-butanol, methyl isobutyl ketone, methyl t-butyl ether, and ethylene glycol. If used, no more than 10 wt-% organic solvent is used in the pre-adhesive reaction mixtures described herein.

Adhesive Compositions and Coatings

The adhesive compositions of the disclosure include at least one cationic polymer or zwitterionic polymer, one or more hydrocarbon tackifiers incorporated therein, and optionally one or more additional components. Additional components include one or more adhesion promoters, surfactants, antifouling agents, thermal or oxidative stabilizers, colorants, adjuvants, plasticizers, solvents, crosslinkers, or mixtures of two or more thereof.

In some embodiments, an emulsified cationic or zwitterionic polymer having one or more hydrocarbon tackifier(s) incorporated therein, at the end of an emulsion polymerization process, is employed as the adhesive composition and is coated as-is onto one or more supports to form a masking article. In such embodiments, water and one or more surfactants employed in the polymerization will remain associated with the adhesive composition, along with any residual unreacted monomers or initiators. The adhesive composition is coated and dried for a period of time sufficient to remove a substantial portion of the water, but in most embodiments the surfactant(s) employed will remain in the dried coating whether or not such surfactants are reacted with and become part of the polymer.

Drying of the emulsion will, in some embodiments, also result in removal of some portion or a substantial portion of any unreacted volatile monomers. In some embodiments, one or more additional components are added to the emulsion containing the cationic or zwitterionic polymer to form the adhesive composition, and the amended emulsion is employed to coat one or more supports and dried to remove a substantial portion of the water and some or a substantial portion of any other remaining volatile components. After drying, it is desirable that the emulsified adhesive compositions include no more than 1 wt-%, for example, 0.5 wt-% to 5 ppm, or 500 ppm to 10 ppm, or 100 ppm to 1 ppm, of unreacted monomers, based on the total weight of monomers added to the emulsion polymerization reaction vessel.

In certain embodiments, the adhesive coating contains the cationic or zwitterionic polymer plus 2 wt-% to 20 wt-% hydrocarbon tackifier, based on the total weight of the cationic or zwitterionic polymer plus the hydrocarbon tackifier. The cationic or zwitterionic polymer contains the monomeric units, which are derived from the monomers included in the pre-adhesive reaction mixture. That is, the cationic or zwitterionic polymer contains monomeric units derived from the cationic monomer, monomeric units derived from the low Tg nonionic monomer, optional monomeric units derived from the anionic monomer, optional monomeric units derived from any optional additional monomers, and optional monomeric units derived from crosslinking monomers. The monomeric units are the polymerized version of the various monomers (e.g., they no longer have an ethylenically unsaturated group).

In some embodiments, the adhesive composition contains at least 80 wt-%, or at least 85 wt-% cationic or zwitterionic polymer, based on the total weight of the cationic or zwitterionic polymer plus the hydrocarbon tackifier. In some embodiments, the adhesive composition contains up to 98 wt-%, or up to 95 wt-% cationic or zwitterionic polymer, based on the total weight of the cationic or zwitterionic polymer plus the hydrocarbon tackifier.

In some embodiments, the adhesive composition contains at least 2 wt-%, at least 3 wt-%, at least 4 wt-%, or at least 5 wt-% hydrocarbon tackifier, based on the total weight of the cationic or zwitterionic polymer plus the hydrocarbon tackifier. In some embodiments, the adhesive composition contains up to 20 wt-%, or up to 15 wt-% hydrocarbon tackifier, based on the total weight of the cationic or zwitterionic polymer plus the hydrocarbon tackifier.

In some embodiments, the adhesive composition contains 80 wt-% to 98 wt-% cationic or zwitterionic polymer plus 2 wt-% to 20 wt-% hydrocarbon tackifier, based on the total weight of the cationic or zwitterionic polymer plus the hydrocarbon tackifier. For example, the adhesive composition can contain 85 wt-% to 98 wt-% cationic or zwitterionic polymer and 2 wt-% to 15 wt-% hydrocarbon tackifier, or 85 wt-% to 95 wt-% cationic or zwitterionic polymer and 5 wt-% to 15 wt-% hydrocarbon tackifier.

The cationic or zwitterionic polymer in any of the adhesive compositions contains the following monomeric units:

2 wt-% to 45 wt-%, based on the total weight of monomeric units, of one or more cationic monomeric units derived from a (meth)acrylate ester having an alkyl ammonium functionality, or a mixture of two or more thereof;

10 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof;

0 wt-% to 10 wt-%, based on the total weight of monomeric units, of one or more crosslinking monomeric units; and 0 wt-% to 5 wt-%, based on the total weight of monomeric units, of one or more anionic monomeric units derived from acrylic acid, methacrylic acid, a carboxylate salt monomer, or a mixture of two or more thereof, wherein the amount of carboxylate salt is determined, based on the weight of the corresponding free acid.

In some example embodiments, the cationic or zwitterionic polymer contains the following monomeric units:

2 wt-% to 20 wt-%, based on the total weight of monomeric units, of one or more cationic monomeric units derived from a (meth)acrylate ester having an alkyl ammonium functionality, or a mixture of two or more thereof;

45 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 20 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof;

0 wt-% to 10 wt-%, based on the total weight of monomeric units, of one or more crosslinking monomeric units; and 0 wt-% to 5 wt-%, based on the total weight of monomeric units, of one or more anionic monomeric units derived from acrylic acid, methacrylic acid, a carboxylate salt thereof, or a mixture of two or more thereof, wherein the amount of carboxylate salt is determined based on the weight of the corresponding free acid.

In other example embodiments, the cationic or zwitterionic polymer contains the following monomeric units:

5 wt-% to 20 wt-%, based on the total weight of monomeric units, of one or more cationic monomeric units derived from a (meth)acrylate ester having an alkyl ammonium functionality, or a mixture of two or more thereof;

60 wt-% to 95 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 10 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof;

0 wt-% to 5 wt-%, based on the total weight of monomeric units, of one or more crosslinking monomeric units; and 0 wt-% to 5 wt-%, based on the total weight of monomeric units, of one or more anionic monomeric units derived from acrylic acid, methacrylic acid, a carboxylate salt thereof, or a mixture of two or more thereof, wherein the amount of carboxylate salt is determined based on the weight of the corresponding free acid.

In still other example embodiments, the cationic or zwitterionic polymer contains the following monomeric units:

5 wt-% to 15 wt-%, based on the total weight of monomeric units, of one or more cationic monomeric units derived from a (meth)acrylate ester having an alkyl ammonium functionality, or a mixture of two or more thereof;

65 wt-% to 95 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 10 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof;

0 wt-% to 5 wt-%, based on the total weight of monomeric units, of one or more crosslinking monomeric units; and 0 wt-% to 5 wt-%, based on the total weight of monomeric units, of one or more anionic monomeric units derived from acrylic acid, methacrylic acid, a carboxylate salt thereof, or a mixture of two or more thereof, wherein the amount of carboxylate salt is determined based on the weight of the corresponding free acid.

In still other example embodiments, the cationic or zwitterionic polymer contains the following monomeric units:

2 wt-% to 20 wt-%, based on the total weight of monomeric units, of one or more cationic monomeric units derived from a (meth)acrylate ester having an alkyl ammonium functionality, or a mixture of two or more thereof;

45 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof; and 0 wt-% to 5 wt-%, based on the total weight of monomeric units, of one or more anionic monomeric units derived from acrylic acid, methacrylic acid, a carboxylate salt thereof, or a mixture of two or more thereof, wherein the amount of carboxylate salt is determined based on the weight of the corresponding free acid.

Cationically emulsified adhesive compositions of the disclosure are characterized by excellent coating viscosity and high shear stability. In embodiments, the viscosity of a cationically stabilized adhesive composition of the disclosure is 20 centipoise (cP) to 2500 cP, or 100 cP to 1500 cP, or 400 cP to 1000 cP. The emulsion viscosity is determined in part by the solids content of the emulsion and the molecular weight of the cationic or zwitterionic polymer formed. The emulsions are stable under shear stress, such that onset of shear instability occurs at or above 80 Pascals (Pa), for example, 90 Pa to 300 Pa, or 100 Pa to 200 Pa.

The viscosity and shear stability of the cationically emulsified adhesive compositions of the disclosure provide broad flexibility in selecting coating methods for coating the adhesive compositions onto one or more supports to form a masking article. Non-limiting examples of useful coating processes employed in conjunction with the adhesive compositions include knife coating, slot coating, die coating, flood coating, rod coating, curtain coating, spray coating, brush coating, dip coating, kiss coating, gravure coating, print coating operations such as flexographic, inkjet, or screen print coating, and the like. In some embodiments, the adhesive compositions are coated as a continuous coating; in other embodiments, they are pattern coated.

Coating of an emulsified adhesive composition is followed by drying using a suitable temperature and period of time for drying that is sufficient to remove a substantial portion of the water and any other volatile substances associated with the emulsion mixture.

Adhesive Articles

The adhesive articles of the disclosure include at least an adhesive composition of the disclosure and a support. It is an advantage of the disclosure that adhesive articles of the disclosure are easy to make, in many embodiments employing a single pass coating operation to fabricate an adhesive article. In embodiments where the adhesive composition is coated as an emulsion, the single coating pass is followed by a drying step. No additional steps are required in order to fabricate an adhesive article of the disclosure.

While the adhesive articles of the disclosure are not particularly limited as to type and shape of the support, in many embodiments the support is a sheet or film suitable for converting to a tape article. The supports may also be provided in roll form. Tape articles are rectangular strips that typically are converted from larger sheets or rolls into the desired width and length. Such conversion is typically carried out after coating the adhesive compositions onto the tape film or sheet. Variables in an adhesive coating process include film or sheet thickness of the support, chemical composition of the support, and nature of the adhesive composition to be coated.

The adhesive articles of the disclosure may be masking articles, whether or not they are used as such. In order to be used as a masking article, any of the adhesive articles described herein are useful as such with no further modification.

An adhesive article is employed in any form or shape, including rectilinear, non-rectilinear shapes, and irregular shapes. Supports employed in forming adhesive articles of the disclosure are typically 12 micrometers to 3 centimeters (cm) thick, or 25 micrometers to 200 micrometers, or 75 micrometers to 150 micrometers thick for a "standard" dimension article, or 200 micrometers to 3 cm for specialized articles. Specialized adhesive articles include articles including a foamed support, for example.

Chemical composition of suitable supports include those selected from a wide variety of polymers and mixtures thereof. Non-limiting examples of suitable supports include paper, including both flat or smooth paper as well as textured paper such as crepe paper, natural or synthetic polymer films, nonwovens made from natural and/or synthetic fibers and combinations thereof, fabric-reinforced polymer films, fiber- or yarn-reinforced polymer films or nonwovens, and multiple layer laminated constructions.

Examples of suitable synthetic polymer films include those made from polyolefins such as polyethylene or polypropylene, polyvinyl chloride, polytetrafluoroethylene and copolymers thereof with fluorinated and non-fluorinated monomers, polyvinylidene chloride and copolymers thereof, polyvinylidene fluoride and copolymers thereof, polyamides such as nylon 6, nylon 6,6, and nylon 12, polyesters such as polyethylene terephthalate, polylactic acid, and polyethylene naphthalate, polyimides, polyurethanes, polyacrylic esters, polycarbonates, and the like, and mixtures of two or more such materials. Such support materials include, in some embodiments, additional materials such as fillers, stabilizers, colorants, and the like. Metal supports, such as tin or aluminum film or sheet supports, are also useful in some embodiments. In some embodiments, the polymers forming the support are in the form of a foam support. In some embodiments, the support is a metalized film. In some embodiments, the support is a multilayered support having two or more layers; in some such embodiments, the layers are laminated. Combinations of two or more such compositions and constructions are also useful in various embodiments of the disclosure.

In some embodiments, the support is embossed or micro-embossed; embossed or micro-embossed supports include any of the support materials and constructions described above. In some embodiments, embossed or micro-embossed features are disposed on the major side of the support contacting the adhesive composition. In other embodiments, the embossed or micro-embossed features are disposed on the major side of the support opposite to the side coated with the adhesive composition. In still other embodiments, embossed or micro-embossed features are disposed on both major sides of the support; the features disposed on the two major sides are the same or different in various embodiments. In some embodiments, the adhesive composition itself includes embossed features, either by virtue of being coated on an embossed surface, or by disposing an adhesive composition between the support and an embossed release liner.

Embossed features imparted to the adhesive compositions themselves are useful, for example, to impart repositionability to the masking articles of the disclosure or allow for air bleed from between the adhesive article and the masked surface. Embossing and micro-embossing are accomplished using techniques known to the skilled artisan and include nip roll embossing using a patterned nip roll, and profile extrusion; secondary processes such as tentering and slicing are further employed in some embodiments to modify surface structures imparted by the embossing or micro-embossing process.

The materials that constitute the support are not particularly limited, and the same materials useful as tape supports are similarly useful in the form of supports other than films or sheets. In various embodiments, such supports are usefully combined with the adhesive compositions of the disclosure to make adhesive articles other than tapes. In some embodiments, the adhesive articles are masking articles. In other embodiments, the adhesive articles are not used in a masking application. Adhesive articles usefully formed by coating with the adhesive compositions of the disclosure include, for example, roofing shingles, carpet squares, carpet backings, vinyl flooring squares, adhesive wall tiles, wallpapers, decorative decals or stickers, automobile detailing features or decals, and plastic or rubber "bumps" employed as feet, spacers, stops, or protectors on various articles, and any number of other applications where pressure sensitive adhesives are usefully employed. Additional materials such as glass or some rigid/brittle plastics or metals that are not traditionally used as tape supports also have utility in some applications in conjunction with the adhesive compositions of the disclosure.

The width and length of the adhesive articles of the disclosure are not particularly limited. In some embodiments, the adhesive articles of the disclosure are converted to tape articles by slicing a coated sheet or film or roll to widths of 0.25 cm to 10 cm, or 0.5 cm to 7.6 cm; however, the width of a tape article is not particularly limited. Additionally, in some embodiments, the adhesive articles of the disclosure are suitably converted to smaller sheets, or rolls, for example, 20 cm by 28 cm sheets, for use by a consumer. In some embodiments, sheets or rolls are provided to a consumer who is then free to divide the sheet or roll into the desired shape and dimensions for use in a specific application.

It is an advantage that the adhesive articles of the disclosure are masking articles, whether or not they are used as such. In order to be used as a masking article, any of the adhesive articles described are useful as such with no further modification.

The shapes easily utilized in conjunction with the supports onto which the adhesive compositions of the disclosure are coated are virtually unlimited in terms of ease of manufacturing and even ease of the end user in converting one supplied shape to a customized shape, for example, by hand cutting with scissors, a box cutter, a hole punch, a die cutter, or any other cutting implement. Thus, for example, a consumer could buy a 20 cm by 28 cm sheet of a masking tape of the disclosure and cut it into the desired shape for a specific end use. Such end uses include, for example, stenciling or patterning wherein the adhesive article is employed to mask an area to be painted and is removed after the paint is applied.

In some embodiments, prior to coating and drying the adhesive compositions of the disclosure on the support, the support is pre-treated. Pre-treatments are applied to, or carried out on, the major surface of the support onto which the adhesive composition will be coated, when an increase in the adhesive bonding between the support and the adhesive composition is necessary to prevent failure of the support-adhesive interface when a tape article or other masking article is removed from the surface onto which it was applied in use.

Pre-treatments include coatings applied to the support surface. One of skill will understand that the nature of such "primer" coatings is specific to each support and specific adhesive composition, and a wide variety of such primer coatings are available—in fact, some support materials are available pre-primed for this purpose. Another type of suitable pre-treatment is roughening the surface of the support prior to coating, which increase surface area for adhesion by the coated adhesive compositions of the disclosure. Yet another type of suitable pre-treatment is corona or plasma treatment of the surface to induce chemical changes that can increase adhesion of the adhesive compositions of the disclosure to the support. While such pre-treatments are useful in some embodiments, in other embodiments many suitable supports, including paper, polyethylene terephthalate, polyvinyl chloride, and polycarbonate, are coated with the compositions in the absence of any type of pre-treatment to improve bonding at the support-adhesive interface.

In some embodiments, where the adhesive article is a tape, the major side opposite the side of the support onto which the adhesive composition will be coated is treated in order to facilitate release of the adhesive from the major side opposite to the adhesive-coated side during unwinding of the tape by the end user. Such coatings, often termed "low adhesion backside" or LAB in the industry, are well known by those of skill and any of the conventionally employed LAB treatments and coatings are suitably applied to the tape supports employed to form the masking tape articles of the disclosure. Conventional LAB treatments are suitably employed in various embodiments of the disclosure to provide tape articles having conventional values of unwind force, for example, of 50 grams per centimeter (g/cm) to 500 g/cm, or 100 g/cm to 350 g/cm, when measured at 180° peel at a rate of 228.6 cm/min and set time of 5 seconds.

In some embodiments, the adhesive article includes a release liner. For example, in some embodiments, it is desirable to form the adhesive article in sheet form, or it is useful for some other reason to avoid having the adhesive article wound upon itself as is commonly done with adhesive tapes. For example, if the end use is a stenciling application, it is generally desirable to employ a release liner—that is, a separate support-type sheet or film—applied to the coated and dried adhesive composition residing on the support. In such embodiments, the support is coated on one major side thereof with the adhesive composition, the adhesive composition is dried if necessary, and a release liner is applied on top of the dried adhesive layer. The release liner is formed from, or coated with, a material that releases cleanly from the adhesive when peeled off by the end user, in embodiments transferring substantially no residue of the release liner material on or in the adhesive. Such release liners are well known by those of skill and any of the conventionally employed release liners are suitably applied to the tape supports employed to form the masking tape articles of the disclosure.

In embodiments where the adhesive article is a tape article, the adhesive compositions of the disclosure are coated onto the selected support at coating weights of 5 grams per square meter ($g/m^2$) to 90 $g/m^2$, or 10 $g/m^2$ to 70 $g/m^2$, or 15 $g/m^2$ to 50 $g/m^2$, of the dried adhesive composition on the support. However, it will be understood that the adhesive articles of the disclosure are not limited to masking tape articles or to masking applications, and for various applications a thicker or thinner coating of the adhesive is useful and is easily optimized by one of skill.

In some embodiments, the adhesive compositions of the disclosure are coated discontinuously on a major side of a support onto which no additional adhesive is coated. Pattern coating and stripe coating are useful in some embodiments to provide an "edge-coated only" adhesive article wherein one or both edges of a tape support are coated with the adhesive composition. Such articles have pressure sensitive adhesive performance over only a portion of the major side that contacts a surface in a masking application, and no adhesion at all over the remainder thereof. In some embodiments, edge-coated only adhesive articles reduce the total amount of coated material per unit of area in forming the tape construction. In some embodiments, an edge-coated only adhesive article has a reduced adhesive force per unit of tape area, which in turn aids in removing the article from a surface after application. In some embodiments, by using an edge-coated only masking article, a surface can effectively be masked wherein adhesive does not contact, for example, a very delicate portion of the surface. Such articles are useful, for example, in highly sensitive applications such as artwork restoration, painting of surfaces contiguous to delicate fabrics, painting of surfaces contiguous to very old woodwork having an original finish, or protecting semiconductor surfaces during coating processes. Because in such edge-coated only articles the edge coating is itself a pressure sensitive adhesive, such masking articles can be formed.

An additional advantage of the edge-coated adhesive articles of the disclosure is that the adhesive force of the edge coating (as evidenced by, e.g., peel adhesion level) is easily adjusted in the same manner as described above for the supports coated entirely with the adhesive compositions of the disclosure. Thus, for example, a masking article is easily formed wherein the edges of the coated major side thereof have a greater or lesser amount of adhesive force to the intended substrate compared to the additional adhesive disposed on at least a portion of the remainder of the major side. Similarly, a masking article is easily formed wherein the edges of the coated major side thereof have a greater or lesser amount of tack compared to the additional adhesive disposed on at least a portion of the remainder of the major side.

In various embodiments, the edge-coated adhesive articles are suitably coated with the adhesive compositions of the disclosure at coating weights of 1 $g/m^2$ to 90 $g/m^2$, or 5 $g/m^2$ to 70 $g/m^2$, or 10 $g/m^2$ to 50 $g/m^2$, of the dried adhesive composition. However, it will be understood that the edge-coated adhesive articles of the disclosure are not limited to masking tape articles or to masking applications, and for various applications a thicker or thinner coating of the adhesive composition is useful and is easily optimized by one of skill. Further, the width of the edge coating is not particularly limited; that is, the distance between the outer edge of the major coated surface and the inner edge of the edge coating can encompass any percent of the total width of the support that is less than 100%. In many embodiments, the edge coating encompasses 5% to 50% of the total width of the support.

Edge coating of the adhesive compositions is suitably carried out using any method known to those of skill. For example, stripe coating, knife coating, brush coating, kiss coating, die coating, or curtain coating are useful means to apply the adhesive compositions of the disclosure to the edges of a support.

Applications of the Adhesive Articles

In various embodiments, the adhesive articles of the disclosure are applied to a selected substrate, whereupon the adhesive composition performs as a pressure sensitive adhesive. Pressure sensitive adhesives are recognized as a standard class of materials. Pressure sensitive adhesives are generally recognized as having tack at temperatures ranging from 15° C. to 25° C. and adhesion to a variety of dissimilar surfaces upon mere contact without the need for more than manual pressure. Pressure sensitive adhesives require no activation by water, solvent or heat in order to exert a strong adhesive holding force towards materials such as paper, cellophane, glass, plastic, wood, and metals. Pressure sensitive adhesives have a sufficiently cohesive holding and elastic nature that, despite their aggressive tackiness, they can be handled with the fingers and removed from smooth surfaces without leaving a substantial residue (see, e.g., Test Methods for Pressure Sensitive Tapes, 6th Ed., Pressure Sensitive Tape Council, 1953). Pressure sensitive adhesives and tapes are well known, and the wide range and balance of properties desired in such adhesives has been well analyzed (see, e.g., U.S. Pat. No. 4,374,883 (Winslow et al.); and "Pressure sensitive Adhesives" in Treatise on Adhesion and Adhesives Vol. 2, "Materials," R. I. Patrick, Ed., Marcel Dekker, Inc., N.Y., 1969).

Substrates on which the adhesive compositions of the disclosure have good performance as a pressure sensitive adhesive, when combined with a suitable support in an adhesive article, include, but are not limited to, glass, metal, wood (including wood products such as cardboard or particleboard), wallboard, synthetic or natural polymers including filled, colored, crosslinked or surface-modified polymers including, for example, polyvinyl chloride, polyesters such as polyethylene terephthalate or polylactic acid, natural or synthetic rubber, polyamides, polyolefins such as polyethylene or polypropylene, appliance or equipment casing materials such as acrylonitrile-butadiene-styrene (ABS) copolymers, polycarbonates, polymethyl methacrylate, and the like; and mixed or composite materials such as polymer-wood composites, and the like, and any painted or primed surface thereof. In particular, substrates on which adhesive compositions that include hydrocarbon tackifiers, as described herein, have been found to be particularly suitable for use on low surface energy substrates (LSE's), particularly polyolefins (e.g., low or high density polyethylenes and polypropylenes), polycarbonates, fluoroplastics, and engineering thermoplastics used, for example, in automobiles (e.g., bumpers).

Additionally, it is a feature of the adhesive compositions of the disclosure that adhesion to a selected surface is easily optimized to a desired level while maintaining the level of cationic and/or anionic monomer present in the cationic or zwitterionic polymer. For example, it is possible to adjust adhesion, as measured by PSTC-101, Test Method A (Harmonized International Standard, Peel Adhesion of Pressure Sensitive Tape; available at http://www.pstc.org/ftles/public/101.pdf), to a level of 50 g/cm and 450 g/cm. This can be done, for example, using a constant level of cationic monomer and varying the type and ratio of the other monomers in the cationic or zwitterionic polymer.

Once applied to the selected substrate surface, the adhesive articles of the disclosure are usefully employed in one or more masking applications. The performance of the adhesive articles of the disclosure as masking articles is characterized by the interaction of the adhesive compositions of the disclosure with the liquid and/or liquid-borne solid materials applied to the masked substrate, wherein the interaction results in the substantial prevention of contact by the liquid or liquid-borne materials with the masked surface. To use the masking article to produce sharp, clean, smooth lines of separation between a masked substrate, which is shielded from a coating, and the unmasked region of the substrate to which a liquid coating is applied, the adhesive article is first adhered to the region of the substrate to be shielded from the coating. Next, the coating is applied to the unmasked region of the substrate and applied to at least the edge of the adhesive article. The coating is then allowed to at least partially dry. Last, the adhesive article is removed from the substrate. Because the adhesive article inhibits the migration of the coating beyond the edge of the masked surface, a clear even line of demarcation is produced between the coated region of the substrate and the masked surface of the substrate.

In many masking applications, the liquid coating applied to the masked substrate is a paint formulation. Paint formulations are solid, semisolid, or liquid particles dispersed in a suspension, i.e., a dispersion or an emulsion, typically though not always an aqueous suspension. In many embodiments, paint formulations are emulsions that are anionically stabilized. In some such embodiments, a paint formulation is a water-based latex (e.g., an emulsion polymer) including one or more anionically charged water soluble polymers and dispersed inorganic pigment particles, wherein the pigment particles are kept in a dispersed state by the stabilizing effect of the one or more water soluble polymers. In other embodiments, the paint is a water-based latex formed by stabilizing pigment particles with one or more anionically charged surfactants in addition to one or more water soluble polymers. In such embodiments, the adhesive compositions of the disclosure inhibit the flow of the paint formulation components onto the masked surface, which is the portion of the masked substrate contacting the adhesive composition. The adhesive composition impedes this flow by destabilizing the paint formulation, either by inducing aggregation of particles within the paint formulation, or by increasing the viscosity of the paint formulation, both of which mechanisms tend to form a barrier that impedes, or otherwise inhibits, the migration of the paint formulation beyond the edge of the interface of the masked substrate and the adhesive composition. The cationic monomer present in either the cationic polymer or the zwitterionic polymer of the adhesive composition interacts with the anionic moieties of the paint formulation, causing the observed effect.

In some embodiments, a liquid coating—whether a paint formulation or some other liquid coating material—is cationically stabilized instead of anionically stabilized such as the paint formulations described above. It is a feature of the disclosure that in embodiments wherein the adhesive article includes a zwitterionic polymer, such cationically stabilized liquid coating compositions are effectively stabilized in the same manner as an anionically stabilized water-borne latex is stabilized. That is, the anionic monomers present in the zwitterionic polymer induce aggregation by destabilization, or induce an increase in viscosity, by interaction of the anionic monomers with the cationic moieties present in the latex.

The masking properties of the adhesive articles of the disclosure work to produce paint lines that have a lower degree of variability around a center line defined by the edge of the masked surface than an edge defined by a conventional masking tape. That is, all other variable remaining constant, an edge of a masked surface formed by applying an adhesive article of the disclosure on a selected substrate will produce a paint line having a lower degree of variability around a center line than an edge provided by a standard masking tape. The center line and degree of variability can be determined using known statistical techniques such as the method of least squares, linear regression, and analysis of variance. Additionally, all other variables remaining constant, an edge of a masked surface formed by applying an adhesive article of the disclosure on a selected substrate will produce a paint line having the same or lower degree of variability around a center line than an edge provided by a commercial edge-treated masking tape.

Another aspect of the masking application is removal of the masking article after the coating operation(s) are carried out. It is a feature of the adhesive articles of the disclosure that regardless of the substrate onto which the adhesive article is applied, removal is substantially clean—that is, there is no observable residue left upon removal of the article, and there is no damage to the substrate as a result of removing the adhesive article. Importantly, there is no observable residue left around the masked surface at the edge of the masked surface when the adhesive articles of the disclosure are removed from a substrate after carrying out a masking application. Without wishing to be limited by theory, it is believed that clean removal of the adhesive articles of the disclosure is due in part to maintenance of a high cohesive strength of the adhesive composition and high adhesive bonding between the adhesive composition and the support over the entirety of the adhesive article and further throughout application, masking, and removal of the adhesive article. Additionally, while not wishing to be limited by theory, it is believed that preventing the migration of the liquid coating applied in a masking operation into the interface defined as the masked surface, and preventing absorption of any liquid as a means of preventing said migration, results in maintaining the integrity of the adhesive article throughout the masking application and results in easy, clean removal from the substrate after the masking is accomplished.

EXEMPLARY EMBODIMENTS

Embodiment 1A is an aqueous polymerizable pre-adhesive reaction mixture comprising: water; one or more cationic (meth)acrylate monomers dissolved in water; and a dispersed phase comprising one or more low Tg nonionic monomer and one or more hydrocarbon tackifiers; wherein the low Tg nonionic monomer has a (meth)acryloyl group and a Tg of no greater than 20° C. when homopolymerized.

Embodiment 2A is the aqueous pre-adhesive reaction mixture of embodiment 1A wherein the hydrocarbon tackifier comprises a C5-based hydrocarbon resin, a C9-based hydrocarbon resin, a C5/C9-based hydrocarbon resin, or a mixture thereof.

Embodiment 3A is the aqueous pre-adhesive reaction mixture of embodiment 1A or 2A wherein the hydrocarbon tackifier comprises a hydrogenated hydrocarbon tackifier.

Embodiment 4A is the aqueous pre-adhesive reaction mixture of any of embodiments 1A to 3A wherein the hydrocarbon tackifier is present in the pre-adhesive reaction mixture in an amount of 2 to 25 parts per one hundred parts total monomers.

Embodiment 5A is the aqueous pre-adhesive reaction mixture of embodiment 4A wherein the hydrocarbon tackifier is present in the pre-adhesive reaction mixture in an amount of 2 to 15 parts per one hundred parts total monomers.

Embodiment 6A is the aqueous pre-adhesive reaction mixture of any one of embodiments 1A to 5A wherein the pre-adhesive reaction mixture further comprises one or more high Tg nonionic monomers having a (meth)acryloyl group and having a Tg of at least 30° C. when homopolymerized.

Embodiment 7A is the aqueous pre-adhesive reaction mixture of embodiment 6A wherein the high Tg nonionic monomers comprise methyl methacrylate, ethyl methacrylate, n-propyl methacrylate, isopropyl methacrylate, n-butyl methacrylate, isobutyl methacrylate, sec-butyl methacrylate, tert-butyl (meth)acrylate, cyclohexyl methacrylate, isobornyl (meth)acrylate, stearyl (meth)acrylate, phenyl acrylate, benzyl methacrylate, 3,3,5 trimethylcyclohexyl (meth)acrylate, 2-phenoxyethyl methacrylate, and mixtures thereof.

Embodiment 8A is the aqueous pre-adhesive reaction mixture of embodiment 6A or 7A wherein the one or more high Tg nonionic monomers are present in the pre-adhesive reaction mixture in an amount of 1 wt-% to 30 wt-%, based on the total weight of the monomers in the pre-adhesive reaction mixture.

Embodiment 9A is the aqueous pre-adhesive reaction mixture of any one of embodiments 1A to 8A wherein the pre-adhesive reaction mixture further comprises one or more chain transfer agents.

Embodiment 10A is the aqueous pre-adhesive reaction mixture of embodiment 9A wherein the one or more chain transfer agents comprise carbon tetrabromide, carbon tetrachloride, mercaptans such as tert-dodecyl mercaptan, n-dodecyl mercaptan, n-octyl mercaptan, 1,8-dimercapto-3,6-dioxaoctane, 2-mercaptoethanol, trimethylolpropane tris(3-mercapto propionate), pentaerythritol tetra(3-mercapto propionate), 3-mercaptoproprionic acid, isooctyl 3-mercapto proprionate, and mixtures thereof.

Embodiment 11A is the aqueous reaction mixture of embodiment 9A or 10A wherein the one or more chain transfer agents are present in the pre-adhesive reaction mixture in an amount of 0.005 to 0.5 parts per one hundred parts total monomers.

Embodiment 12A is the aqueous pre-adhesive reaction mixture of any one of embodiments 1A to 11A wherein the one or more cationic (meth)acrylate monomers comprise a (meth)acrylate ester having an alkyl ammonium functionality (e.g., a trialklyl ammonium functionality).

Embodiment 13A is the aqueous pre-adhesive reaction mixture of any one of embodiments 1A to 12A wherein the one or more cationic (meth)acrylate monomers are present in the pre-adhesive reaction mixture in an amount of 2 wt-% to 45 wt-%, based on the total weight of the monomers in the pre-adhesive reaction mixture.

Embodiment 14A is the aqueous pre-adhesive reaction mixture of any one of embodiments 1A to 13A wherein the one or more low Tg nonionic monomer is an alkyl acrylate with the alkyl being a non-tertiary alkyl group having 1 to 18 carbon atoms.

Embodiment 15A is the aqueous pre-adhesive reaction mixture of any one of embodiments 1A to 14A wherein the one or more low Tg nonionic monomer comprises a non-tertiary alkyl (meth)acrylate having an alkyl group with 1 to 18 carbon atoms, 4 to 18 carbon atoms, 6 to 18 carbon atoms, 8 to 18 carbon atoms, 8 to 16 carbon atoms, or 8 to 14 carbon atoms.

Embodiment 16A is the aqueous pre-adhesive reaction mixture of embodiment 15A wherein the low Tg nonionic monomer comprises an isomer blend of alkyl (meth)acrylate monomers with the alkyl group having 6 to 18 carbon atoms, 8 to 18 carbon atoms, 8 to 16 carbon atoms, or 8 to 14 carbon atoms.

Embodiment 17A is the aqueous pre-adhesive reaction mixture of embodiment 16A, wherein the low Tg nonionic monomer comprises an isomer blend of alkyl (meth)acrylate monomers with the alkyl group having 8 to 14 carbon atoms.

Embodiment 18A is the aqueous pre-adhesive reaction mixture of any one of embodiments 15A to 17A, wherein the non-tertiary alkyl (meth)acrylate comprise methyl acrylate, ethyl acrylate, n-propyl acrylate, n-butyl acrylate, n-butyl methacrylate, isobutyl acrylate, sec-butyl acrylate, n-pentyl acrylate, 2-methylbutyl acrylate, n-hexyl acrylate, cyclohexyl acrylate, 4-methyl-2-pentyl acrylate, 2-methylhexyl acrylate, 2-ethylhexyl acrylate, n-octyl acrylate, 2-octyl acrylate, isooctyl acrylate, isononyl acrylate, isoamyl acrylate, n-decyl acrylate, isodecyl acrylate, n-decyl methacrylate, lauryl acrylate, isotridecyl acrylate, n-octadecyl acrylate, isostearyl acrylate, n-dodecyl methacrylate, isomers thereof, and/or isomer blends thereof.

Embodiment 19A is the aqueous pre-adhesive reaction mixture of any one of embodiments 1A to 18A wherein the one or more low Tg nonionic monomers are present in the pre-adhesive reaction mixture in an amount of 10 wt-% to 98 wt-%, or 50 wt-% to 98 wt-%, based on the total weight of the monomers in the pre-adhesive reaction mixture.

Embodiment 20A is the aqueous pre-adhesive reaction mixture of any one of embodiments 1A to 19A wherein the pre-adhesive reaction mixture further comprises one or more anionic (meth)acrylate monomers.

Embodiment 21A is the aqueous pre-adhesive reaction mixture of embodiment 20A wherein the anionic (meth)

acrylate monomers comprise acrylic acid, methacrylic acid, a salt thereof, or a mixture of two or more thereof.

Embodiment 22A is the aqueous pre-adhesive reaction mixture of embodiment 20A or 21A wherein the one or more anionic (meth)acrylate monomers are present in the pre-adhesive reaction mixture in an amount of 0 wt-% to 5 wt-%, or 0.2 wt-% to 5 wt-%, based on the total weight of the monomers in the pre-adhesive reaction mixture.

Embodiment 23A is the aqueous pre-adhesive reaction mixture of any one of embodiments 1A to 22A, wherein the pre-adhesive reaction mixture comprises:

2 wt-% to 45 wt-%, based on the total weight of monomers, of one or more cationic monomers comprising a (meth)acrylate ester having an alkyl ammonium functionality;

10 wt-% to 98 wt-%, based on the total weight of monomers, of one or more low Tg nonionic monomers having a (meth)acryloyl group and having a Tg of no more than 20° C. when homopolymerized;

0 wt-% to 30 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof;

0 wt-% to 10 wt-%, based on the total weight of monomer, of one or more crosslinking monomers; and 0 wt-% to 5 wt-%, based on the total weight of monomers, of one or more anionic monomers comprising acrylic acid, methacrylic acid, a carboxylate salt monomer, or a mixture of two or more thereof, wherein the amount of carboxylate salt is determined based on the weight of the corresponding free acid.

Embodiment 24A is the aqueous pre-adhesive reaction mixture of any one of embodiments 1A to 22A, wherein the pre-adhesive reaction mixture comprises:

2 wt-% to 20 wt-%, based on the total weight of monomers, of one or more cationic monomers comprising a (meth)acrylate ester having an alkyl ammonium functionality;

45 wt-% to 98 wt-%, based on the total weight of monomers, of one or more low Tg nonionic monomers having a (meth)acryloyl group and having a Tg no greater than 20° C. when homopolymerized;

0 wt-% to 30 wt-%, based on the total weight of monomers, of one or more optional monomers comprising a) one or more high Tg nonionic monomer having a (meth)acryloyl group and having a Tg of at least 30° C. when homopolymerized, b) one or more polar monomer having a hydroxyl group, primary amido group, secondary amido group, a tertiary amido group, an amino group, an ether group, or an epoxy group, c) one or more vinyl monomer that is free of a (meth)acryloyl group, or d) a mixture of two or more thereof; and 0 wt-% to 5 wt-%, based on the total weight of the monomers, of one or more anionic monomers comprising acrylic acid, methacrylic acid, a carboxylate salt thereof, or a mixture of two or more thereof, wherein the amount of carboxylate salt is determined based on the weight of the corresponding free acid.

Embodiment 25A is an aqueous polymerizable pre-adhesive reaction mixture comprising: water; one or more cationic (meth)acrylate monomers; one or more high Tg nonionic monomers having a Tg of at least 30° C. when homopolymerized; one or more chain transfer agents; and a dispersed phase comprising one or more low Tg nonionic (meth)acrylate monomers and one or more hydrocarbon tackifiers.

Embodiment 1B is a polymerized product of the aqueous pre-adhesive reaction mixture of any one of embodiments 1A to 25A.

Embodiment 1C is an adhesive composition comprising 80 wt-% to 98 wt-% of a cationic or zwitterionic polymer and 2 wt-% to 20 wt-% of a hydrocarbon tackifier, based on the total weight of the cationic or zwitterionic polymer plus the hydrocarbon tackifier.

Embodiment 2C is the adhesive composition of embodiment 1C, wherein the cationic or zwitterionic polymer comprises:

2 wt-% to 45 wt-%, based on the total weight of monomeric units, of one or more cationic monomeric units derived from a (meth)acrylate ester having an alkyl ammonium functionality, or a mixture of two or more thereof;

10 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof, 0 wt-% to 10 wt-%, based on the total weight of monomeric units, of one or more crosslinking monomeric units; and 0 wt-% to 5 wt-%, based on the total weight of monomeric units, of one or more anionic monomeric units derived from acrylic acid, methacrylic acid, a carboxylate salt monomer, or a mixture of two or more thereof, wherein the amount of carboxylate salt is determined, based on the weight of the corresponding free acid.

Embodiment 3C is the adhesive composition of embodiment 1C or 2C wherein the cationic or zwitterionic polymer comprises:

2 wt-% to 20 wt-%, based on the total weight of monomeric units, of one or more cationic monomeric units derived from a (meth)acrylate ester having an alkyl ammonium functionality, or a mixture of two or more thereof;

45 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof, 0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof; and 0 wt-% to 5 wt-%, based on the total weight of monomeric units, of one or more anionic monomeric units derived from acrylic acid, methacrylic acid, a carboxylate salt thereof, or a mixture of two or more thereof, wherein the amount of carboxylate salt is determined based on the weight of the corresponding free acid.

Embodiment 4C is the adhesive composition of any one of embodiments 1C to 3C wherein the hydrocarbon tackifier comprises a C5-based hydrocarbon resin, a C9-based hydrocarbon resin, a C5/C9-based hydrocarbon resin, or a mixture thereof.

Embodiment 5C is the adhesive composition of any one of embodiments 1C to 4C wherein the hydrocarbon tackifier comprises a hydrogenated hydrocarbon tackifier.

Embodiment 6C is the adhesive composition of any one of embodiments 1C to 5C wherein the cationic or zwitterionic polymer comprises one or more monomeric units derived from high Tg nonionic monomers having a Tg of at least 30° C. when homopolymerized.

Embodiment 7C is the adhesive composition of embodiment 6C wherein the high Tg nonionic monomers comprise methyl methacrylate, ethyl methacrylate, n-propyl methacrylate, isopropyl methacrylate, n-butyl methacrylate, isobutyl methacrylate, sec-butyl methacrylate, tert-butyl (meth)acrylate, cyclohexyl methacrylate, isobornyl (meth) acrylate, stearyl (meth)acrylate, phenyl acrylate, benzyl methacrylate, 3,3,5 trimethylcyclohexyl (meth)acrylate, 2-phenoxyethyl methacrylate, and mixtures thereof.

Embodiment 8C is the adhesive composition of embodiment 6C or 7C wherein the one or more monomeric units derived from high Tg nonionic monomers are present in the cationic or zwitterionic polymer in an amount of 1 wt-% to 30 wt-%, based on the total weight of monomeric units.

Embodiment 9C is the adhesive composition of embodiment 8C wherein the one or more monomeric units derived from high Tg nonionic monomers are present in the cationic or zwitterionic polymer in an amount of 5 wt-% to 20 wt-%, based on the total weight of monomeric units.

Embodiment 10C is the adhesive composition of any one of embodiments 1C to 9C wherein the one or more anionic (meth)acrylate monomeric units are present in the zwitterionic polymer in an amount of 0.2 wt-% to 5 wt-%, based on the total weight of monomeric units.

Embodiment 11C is the adhesive composition of any one of embodiments 1C to 10C wherein the amount of the hydrocarbon tackifier is in a range of 2 wt-% to 20 wt-%, or 2 wt-% to 15 wt-%, based on a total weight of the cationic or zwitterionic polymer plus the hydrocarbon tackifier.

Embodiment 1D is an adhesive article comprising a support having first and second opposed major surfaces, and an adhesive composition of any one of embodiments 1C to 11C disposed on at least a portion of at least one of the first and second opposed major surfaces.

Embodiment 2D is the adhesive article of embodiment 1D wherein the article is a masking tape.

Embodiment 3D is the adhesive article of embodiment 1D wherein the article is a stenciling article.

Embodiment 4D is the adhesive article of embodiment 1D further comprising a release liner contacting at least a portion of the adhesive composition, such that the contacted adhesive composition is disposed between the support and the release liner.

Embodiment 1E is a method of making an adhesive article, the method comprising:

forming an aqueous polymerizable pre-adhesive reaction mixture according to any of embodiments 1A to 25A;

polymerizing the monomers in the pre-adhesive reaction mixture to form a polymerized mixture;

coating the polymerized mixture onto a support to form a coated mixture; and drying the coated mixture.

Embodiment 2E is the method of embodiment 1E wherein the aqueous polymerizable pre-adhesive reaction mixture comprises one or more anionic (meth)acrylate monomers.

Embodiment 3E is the method of embodiment 1E or 2E wherein the pre-adhesive reaction mixture further comprises one or more surfactants.

Embodiment 4E is the method of any one of embodiments 1E to 3E wherein the pre-adhesive reaction mixture further comprises a thermal initiator and the polymerizing is accomplished by heating the pre-adhesive reaction mixture to a temperature of about 40° C. to 80° C.

Embodiment 5E is the method of any one of embodiments 1E to 4E further comprising neutralizing the polymerized mixture to a pH of about 4 to 7.

Embodiment 6E is the method of any one of embodiments 1E to 5E wherein the coating is accomplished by die coating, knife coating, curtain coating, flood coating, spray coating, or cast coating.

Embodiment 7E is the method of any one of embodiments 1E to 6E wherein the support comprises a flat paper, a smooth paper, a textured paper, a natural polymer film, a synthetic polymer film, a natural polymer nonwoven, a synthetic polymer nonwoven, a fabric reinforced film, a fiber or yarn reinforced film, a fiber or yarn reinforced nonwoven, multiple layered constructions thereof, and laminated constructions thereof.

Embodiment 1F is the adhesive article prepared by the method of any one of embodiments 1E to 7E.

Embodiment 2F is the adhesive article of embodiment 1F wherein the article is a masking tape.

Embodiment 1G is an emulsion composition comprising a cationic or zwitterionic polymer and a hydrocarbon tackifier.

Embodiment 2G is the emulsion composition of embodiment 1G comprising 80 wt-% to 98 wt-% of a cationic or zwitterionic polymer and 2 wt-% to 20 wt-% of a hydrocarbon tackifier, based on the total weight of the cationic or zwitterionic polymer plus the hydrocarbon tackifier.

Embodiment 3G is the emulsion composition of embodiment 1G or 2G, wherein the cationic or zwitterionic polymer comprises:

2 wt-% to 45 wt-%, based on the total weight of monomeric units, of one or more cationic monomeric units derived from a (meth)acrylate ester having an alkyl ammonium functionality, or a mixture of two or more thereof;

10 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof, 0 wt-% to 10 wt-%, based on the total weight of monomeric units, of one or more crosslinking monomeric units; and 0 wt-% to 5 wt-%, based on the total weight of monomeric units, of one or more anionic monomeric units derived from acrylic acid, methacrylic acid, a carboxylate salt monomer, or a mixture of two or more thereof, wherein the amount of carboxylate salt is determined, based on the weight of the corresponding free acid.

Embodiment 4G is the emulsion composition of any one of embodiments 1G to 3G wherein the cationic or zwitterionic polymer comprises:

2 wt-% to 20 wt-%, based on the total weight of monomeric units, of one or more cationic monomeric units derived from a (meth)acrylate ester having an alkyl ammonium functionality, or a mixture of two or more thereof;

45 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof, 0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof, 0 wt-% to 5 wt-%, based on the total weight of monomeric units, of one or more anionic monomeric units derived from acrylic acid, methacrylic acid, a carboxylate salt thereof, or a mixture of two or more thereof wherein the amount of carboxylate salt is determined based on the weight of the corresponding free acid.

Embodiment 5G is the emulsion composition of any of embodiments 1G to 4G wherein the hydrocarbon tackifier comprises a C5-based hydrocarbon resin, a C9-based hydrocarbon resin, a C5/C9-based hydrocarbon resin, or a mixture thereof.

Embodiment 6G is the emulsion composition of any of embodiments 1G to 5G wherein the hydrocarbon tackifier comprises a hydrogenated hydrocarbon tackifier.

Embodiment 7G is the emulsion composition of any one of embodiments 1G to 6G wherein the cationic or zwitterionic polymer comprises one or more monomeric units derived from high Tg nonionic monomers having a (meth) acryloyl group and having a Tg of at least 30° C. when homopolymerized.

Embodiment 8G is the emulsion composition of embodiment 7G wherein the high Tg nonionic monomers comprise methyl methacrylate, ethyl methacrylate, n-propyl methacrylate, isopropyl methacrylate, n-butyl methacrylate, isobutyl methacrylate, sec-butyl methacrylate, tert-butyl (meth)acrylate, cyclohexyl methacrylate, isobornyl (meth) acrylate, stearyl (meth)acrylate, phenyl acrylate, benzyl methacrylate, 3,3,5 trimethylcyclohexyl (meth)acrylate, 2-phenoxyethyl methacrylate, and mixtures thereof.

Embodiment 9G is the emulsion composition of embodiment 7G or 8G wherein the one or more monomeric units derived high Tg nonionic monomers are present in the cationic or zwitterionic polymer in an amount of 1 wt-% to 30 wt-%, based on the total weight of monomeric units.

Embodiment 10G is the emulsion composition of any one of embodiments 1G to 9G wherein the one or more anionic (meth)acrylate monomers are present in the zwitterionic polymer in an amount of 0.2 wt-% to 5 wt-%, based on the total weight of monomeric units.

Embodiment 11G is the emulsion composition of any one of embodiments 1G to 10G wherein the amount of the hydrocarbon tackifier is in a range of 2 wt-% to 15 wt-% based on a total weight of the cationic or zwitterionic polymer plus the hydrocarbon tackifier.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

| Designation | Description |
|---|---|
| EC-25 | Cocoalkylmethyl[polyoxyethylene (15)] ammonium chloride, 95% minimum active surfactant solution, available under the trade designation ETHOQUAD C/25, from Akzo Nobel N.V., Amsterdam, Netherlands. |
| IOA | Isooctyl acrylate, obtained from 3M Company, St. Paul, MN. |
| IBOA | Isobornyl acrylate, obtained from San Ester Corp., NY, NY. |
| 2-EHA | 2-Ethyl hexyl acrylate, available from BASF SE, Ludwigshafen, Germany. |
| C12 Acrylate | Dodecyl acrylate isomer blend, obtained from 3M Company, St. Paul, MN, and prepared are described in U.S. Pat. No. 9,102,774 (Clapper et al.). |
| C13 Acrylate | Tridecyl acrylate, available under trade designation SR489D from Sartomer Americas, Exton, PA. |
| MAA | Methacrylic acid, available from Alfa Aesar, Ward Hill, MA. |
| DMAEA-MCL | Dimethylaminoethyl acrylate methyl chloride quaternary, 80% in water, available under trade designation AGEFLEX FA1Q80MC from BASF SE, Ludwigshafen, Germany. |
| VA | Vinyl acetate, available from Alfa Aesar, Ward Hill, MA. |
| V-50 | 2,2'-Azobis (2-amidinopropane) dihydrochloride, available from Wako Chemicals USA, Richmond, VA. |
| CBr4 | Carbon tetrabromide, a chain transfer agent (CTA), available from Sigma-Aldrich Co. LLC., St. Louis, MO. |
| t-DDM | tert-Dodecyl mercaptan, a chain transfer agent (CTA), available from Sigma-Aldrich Co. LLC, St. Louis, MO. |
| PTMP | Pentaerythritol tetra(3-mercapto propionate), a chain transfer agent (CTA), available from Sigma-Aldrich Co. LLC, St. Louis, MO. |
| R1094 | A hydrogenated hydrocarbon resin, having a softening point of 95° C., glass transition temperature of 40° C., number average molecular weight of 550 g/mol, available under the trade designation REGALREZ 1094 from Eastman Chemical Company, Kingsport, Tennessee. |

-continued

| Designation | Description |
|---|---|
| P100 | A hydrogenated hydrocarbon resin, having a softening point of 100° C., glass transition temperature of 45° C., number average molecular weight of 850 g/mol, available under the trade designation ARKON P-100 from Arakawa Chemical Industries, LTD, Osaka, Japan. |
| W10 | Liquid hydrocarbon resin, having a softening point of 10° C., glass transition temperature of −31° C., molecular weight of 500 g/mol, available under the trade designation WINGTACK 10 from Total Cray Valley Co., Exton, PA. |

Test Methods

Glass Transition Temperature (Tg)

Samples were prepared by coating the polymer (e.g., polymerized emulsion composition) onto a TEFLON substrate and drying at 70° C. The dried film was removed and folded several times to yield a sample having a thickness of approximately 1 to 2 millimeters (0.04 to 0.08 inch). A test sample measuring 8 millimeters (0.31 inch) in diameter was punched out and placed between the 8 millimeter diameter parallel steel plates of a rheometer (Model DHR-2 Discover Hybrid Rheometer, TA Instruments, New Castle, Del.) and dynamic mechanical analysis was carried out to determine the Tg. The following parameters were employed: a controlled shear strain of 5% at frequency of 1 radian/second, and a temperature scan from 25° C. to −65° C. at a rate of 3° C./minute. The glass transition temperature (Tg) was taken as the peak of the tan delta curve.

Peel Adhesion Strength (180 Degree Angle)—Method A: Glass Substrate

Glass plates, measuring 30.5 centimeters (12 inches) long by 12.7 centimeters (5 inches) wide by 0.13 centimeters (0.050 inches) thick, were prepared for testing by cleaning with diacetone alcohol (once), ethanol (once), and n-heptane (three times) using a clean, lint free tissue (available under the trade designation KIMWIPE, available from Kimberly-Clark Corporation, Neenah, Wis.) with the last cleaning taking place immediately preceding sample preparation. The adhesive tapes were cut into strips measuring 1.91 centimeters (0.75 inch) wide and at least 30.5 centimeters (12 inches) long and bonded to the glass plate such that the contact area was 1.91 centimeters (0.75 inches) wide by approximately 25.4 centimeters (10 inches) long. A 2 kilogram (4.5 pound) rubber roller was then rolled once over the assembly. Within a minute after applying the tape, the peel test was run at an angle of 180 degrees and at a rate of 228.6 centimeters/minute (90 inches/minute) with an averaging time of 2 seconds using a peel tester (Model IMASS SP-2000 Slip/Peel Tester, available from IMASS, Inc., Accord, Mass.). At least three peel test measurements were made for each adhesive tape sample and the results were recorded and averaged in ounces force/inch (Newtons/centimeter).

Peel Adhesion Strength (180 Degree Angle)—Method B: LDPE Substrate

Peel Adhesion Strength A was repeated with the following modifications. The substrate used was a low surface energy (LSE) panel made of linear low density polyethylene (LDPE) (available from Quadrant EPP USA Inc., Reading, Pa.), the averaging time was 20 seconds, and the panels were not cleaned prior to use.

Peel Adhesion Strength (180 Degree Angle)—Method C: LDPE with 3 Days Dwell

Peel Adhesion Strength B was repeated with the following. After the tape was applied to the LDPE panel and rolled down, the assembly was left to dwell for three days at a constant temperature and humidity of 23° C. and 50% relative humidity before the peel test run was performed.

Peel Adhesion Strength (180 Degree Angle)—Method D: Painted Substrate

Preparation of Painted Substrate

Birch wood panels primed with a coat of PROMAR 200 ZERO VOC PRIMER (Sherwin-Williams Company, Cleveland, Ohio) and measuring 15.2 centimeters (6 inches) by 30.5 centimeters (12 inches) were obtained from Mailand Wood Products, Centuria, Wis. These were coated with either test Paint 1: a test paint having a flat finish, a deep base, and an Egyptian Nile color (available under the trade designation BEHR PREMIUM PLUS ULTRA PAINT from Behr Process Corporation, Santa Ana, Calif.); or test Paint 2: a test paint having an eggshell finish, and a white color (available under the trade designation DURATION HOME INTERIOR ACRYLIC LATEX from Sherwin-Williams Company, Cleveland, Ohio).

Two coats of the test paint were applied to the primed side of a wood panel using a PURDY WHITE DOVE one quarter inch nap paint roller (available from Purdy Corporation, Cleveland, Ohio). Rolling was done lengthwise along the birch board, perpendicular to the direction of tape application. The first coat of paint was allowed to dry to the touch before applying the second coat. The painted substrates were allowed to cure by standing at room temperature for a minimum of 7 days prior to testing.

Sample Preparation and Testing

Adhesive tapes were cut into strips measuring 2.54 centimeters (1 inch) wide and at least 15.2 centimeters (6 inches) long and bonded with the tape length across the width of the painted substrate such that the contact area was 2.54 centimeters (1 inch) wide by approximately 12.7 centimeters (5 inches) long. A 2-kilogram (4.5 pound) rubber roller was then rolled back and forth twice over the assembly. Within a minute after applying the tape, the peel test was run at an angle of 180 degrees and a rate of 228.6 centimeters/minute (90 inches/minute) with an average data acquisition time of two seconds using a peel tester (Model IMASS SP-2000 Slip/Peel Tester, available from IMASS, Inc., Accord, Mass.). At least three peel test measurements were made for each adhesive tape sample and the results were recorded and averaged in ounces force/inch (Newtons/centimeter).

Holding Power on LDPE Substrate

Adhesive tapes were cut into strips measuring 1.91 centimeters (0.75 inch) wide and at least 12.7 centimeters (5 inches) long and bonded lengthwise on a 7.6 centimeters by 12.7 centimeters (3 inches by 5 inches) low surface energy (LSE) panel made of linear low density polyethylene (LDPE) (available from Quadrant EPP USA Inc., Reading, Pa.) such that the contact area was 1.91 centimeters (0.75 inch) wide by 10.2 centimeters (4 inches) long. A 2-kilogram (4.5 pound) rubber roller was then rolled back and forth twice over the assembly at a speed of 61 centimeters per minute (24 inches per minute). The assembly was left to dwell for 3 days at a constant temperature and humidity of 23° C. and 50% relative humidity. A hook was attached to the unbonded end of the tape and the panel was placed on a frame tilted at an angle of 30 degrees from vertical such that the hooked leading edge hung downward at an angle of 30 degrees from the substrate. A 200-gram weight was placed on the hook and the time in minutes for the sample to fall off from the panel was recorded.

General Procedures

Emulsion Polymer Synthesis A: Without Hydrocarbon Resin

A 0.95-liter (32 ounce) glass bottle was charged with IOA, 2-EHA, C12 Acrylate, or C13 Acrylate followed by addition of a chain transfer agent ($CBr_4$, t-DDM, or PTMP), DMAEA-MCL, MAA, VA, water, EC-25, and V-50 (0.375 parts per hundred of total monomer). The reaction mixture was purged with nitrogen for two minutes, after which the bottle was sealed tight with a plastic cap. Next, the bottle was rotated in a water bath set at 50° C. for 24 hours. The pH of the resulting solution was adjusted to between 5 and 5.5 by adding aqueous sodium hydroxide solution, followed by filtering through a PET-50GG-355 mesh having an opening of 355 micrometers (available from Sefar Inc., Buffalo, N.Y.) The amount of filtered coagulum was typically less than 1% by weight of the total amount of monomer, unless otherwise noted. The resulting emulsion without hydrocarbon resin was found to contain less than 0.5 weight percent (wt-%) unreacted monomer by gravimetric analysis.

Emulsion Polymer Synthesis B: With Hydrocarbon Resin

Emulsion Polymer Synthesis A was repeated with the following modifications. A hydrocarbon resin was combined with IOA, 2-EHA, C12 Acrylate, or C13 Acrylate monomer, and mixed until the resin dissolved completely to create a monomer/hydrocarbon resin premix. This premix was then used in place of IOA, 2-EHA, C12 Acrylate, or C13 Acrylate alone to prepare an emulsion with hydrocarbon resin as described in the "Emulsion Polymer Synthesis A" preparation. The resulting emulsion with hydrocarbon resin was found to contain less than 0.5 wt-% unreacted monomer by gravimetric analysis.

Preparation of Adhesive Tapes: Method A

Adhesive tape samples were prepared by knife coating an emulsion onto the primed side of a biaxially oriented polypropylene film substrate (primed with an acrylate polymer mixture) measuring 15.24 centimeters (6 inches) wide and 0.036 millimeter (0.0014 inch) thick using a gap setting between 0.051 to 0.076 millimeter (0.002 to 0.003 inch) greater than the thickness of the film. The coated film substrate was dried in a forced air oven at 82° C. (180° F.) for sixty seconds. Next, after waiting at least five days, the adhesive tape samples were equilibrated for 24 hours at a constant temperature and humidity of 23° C. and 50% relative humidity prior to evaluating peel adhesion strength and holding power.

Preparation of Adhesive Tapes: Method B

Adhesive tape samples were prepared by knife coating an emulsion onto the primed side of a paper substrate suitable for use as a masking tape substrate (saturated with an acrylic saturant similar to the type disclosed in U.S. Pat. Publ. No. 2015/0035204 (Stoner et al.) and primed with a polyvinylidene chloride primer) measuring 15.2 centimeters (6 inches) wide and 0.14 millimeter (0.0054 inch) thick using a gap setting between 0.076 to 0.102 millimeter (0.003 to 0.004 inch) greater than the thickness of the paper. The coated paper substrate was passed through a three zone, forced air oven; wherein the first zone temperature was 65.6° C. (150° F.), second zone temperature was 79.4° C. (175° F.), and third zone temperature was 121° C. (250° F.). The residence time in zones 1 and 2 was 40 seconds, and 80 seconds for the third zone. For some examples, the coating weight was determined in the following manner after allowing coated samples to cool to room temperature. Test strips measuring 4 inches wide by 6 inches long were cut from both adhesive-coated and non-coated film substrates and weighed. The difference in the weight between coated and non-coated paper substrates was used to determine the adhesive coating weight which was reported in grams/square meter. All adhesive tape samples were allowed to stand for at least five days before being equilibrated for 24 hours at a constant temperature and humidity of 23° C. and 50% relative humidity and then evaluated for peel adhesion strength.

Comparative Examples 1-3 (CE 1-3)

Comparative Examples 1-3 having no hydrocarbon resin were prepared using "Emulsion Polymer Synthesis A" described above. The resulting emulsion had percent solids of approximately 50% by weight. These were used to prepare samples for evaluation of glass transition temperature (Tg); and to prepare adhesive tapes (Method A) for evaluation of 180 degree angle peel adhesion strength (Method A: Glass, and Method B: LDPE). The compositions and results are shown in Tables 1 and 2 below.

Examples 1-5

Examples 1-5 having hydrocarbon resin were prepared using "Emulsion Polymer Synthesis B" described above. Hydrocarbon resin was added in the amount shown as parts per hundred (pph) of total monomer. The resulting emulsions had percent solids of approximately 50% by weight. These were used to prepare samples for evaluation of glass transition temperature (Tg); and to prepare adhesive tapes (Method A) for evaluation of 180 degree angle peel adhesion strength (Method A: Glass, and Method B: LDPE). The compositions and results are shown in Tables 1 and 2 below.

TABLE 1

Compositions

| Ex. No. | 2-EHA (g) | IOA (g) | DMAEA-MCL (g solid) | VA (g) | MAA (g) | EC-25 (g) | CTA (pph) $CBr_4$ | CTA (pph) t-DDM | Water (g) | Hydrocarbon Resin | Hydrocarbon Resin (pph) |
|---|---|---|---|---|---|---|---|---|---|---|---|
| CE 1 | 85 | 0 | 8 | 5 | 2 | 1 | 0.03 | 0 | 100 | None | 0 |
| 1 | 85 | 0 | 8 | 5 | 2 | 1 | 0.03 | 0 | 100 | R1094 | 5 |
| CE 2 | 0 | 85 | 8 | 5 | 2 | 1 | 0.03 | 0 | 100 | None | 0 |
| 2 | 0 | 85 | 8 | 5 | 2 | 1 | 0.03 | 0 | 105 | P100 | 5 |
| 3 | 0 | 85 | 8 | 5 | 2 | 1 | 0.03 | 0 | 110 | P100 | 10 |
| 4 | 0 | 85 | 8 | 5 | 2 | 1 | 0.03 | 0 | 115 | P100 | 15 |
| CE 3 | 0 | 85 | 8 | 5 | 2 | 1 | 0 | 0.018 | 110 | None | 0 |
| 5 | 0 | 85 | 8 | 5 | 2 | 1 | 0 | 0.018 | 110 | P100 | 5 |

* pph: parts per one hundred parts total monomer

TABLE 2

| Results | | | | | | | |
|---|---|---|---|---|---|---|---|
| Ex. No. | Hydrocarbon Resin | Hydrocarbon Resin Amount (pph) | $CBr_4$ (pph) | t-DDM (pph) | Tg (° C.) | Glass Peel Adhesion (oz/in; N/cm) | LDPE Peel Adhesion (oz/in; N/cm) |
| CE 1 | None | 0 | 0.03 | 0 | −51.7 | 21.9; 2.40 | 6.3; 0.69 |
| 1 | R1094 | 5 | 0.03 | 0 | −47.9 | 22.2; 2.43 | 8.9; 0.97 |
| CE 2 | None | 0 | 0.03 | 0 | −44.1 | 21.8; 2.39 | 4.3; 0.47 |
| 2 | P100 | 5 | 0.03 | 0 | −39.4 | 22.0; 2,41 | 8.5; 0.93 |
| 3 | P100 | 10 | 0.03 | 0 | −37.5 | 14.0; 1.53 | 9.1; 1.00 |
| 4 | P100 | 15 | 0.03 | 0 | −36.5 | 15.3; 1.67 | 8.2; 0.90 |
| CE 3 | None | 0 | 0 | 0.018 | −45.0 | 24.0; 2.63 | 5.1; 0.56 |
| 5 | P100 | 5 | 0 | 0.018 | −40.3 | 25.3; 2.77 | 8.5; 0.93 |

The above examples demonstrate the successful incorporation of hydrocarbon resin at different loading levels. The adhesion to an LSE substrate, as represented by LDPE, was improved with the use of the hydrocarbon resin, whereas the adhesion to glass is either similar or lower compared to the comparative example having no hydrocarbon resin.

Comparative Examples 4-5 (CE 4-5)

Comparative Examples 4-5 having no hydrocarbon resin were prepared using “Emulsion Polymer Synthesis A” described above. The resulting emulsion had percent solids of approximately 50% by weight. These were used to prepare samples for evaluation of glass transition temperature (Tg); and to prepare adhesive tapes (Method A) for evaluation of 180 degree angle peel adhesion strength (Method A: Glass, and Method C: LDPE—with 3 Days Dwell) and Holding Power on LDPE. The composition and results are shown in Tables 3 and 4 below.

Examples 6-18

Examples 6-18 having hydrocarbon resin were prepared using “Emulsion Polymer Synthesis B” described above. Hydrocarbon resin was added in the amount shown as parts per hundred (pph) of total monomer. The resulting emulsions had percent solids of approximately 50% by weight. These were used to prepare samples for evaluation of glass transition temperature (Tg); and to prepare adhesive tapes (Method A) for evaluation of 180 degree angle peel adhesion strength (Method A: Glass, and Method C: LDPE—with 3 Days Dwell) and Holding Power on LDPE. The compositions and results are shown in Tables 3 and 4 below.

TABLE 3

| Compositions | | | | | | | | | |
|---|---|---|---|---|---|---|---|---|---|
| Ex. No. | IOA (g) | IBOA (g) | DMAEA-MCL (g solids) | VA (g) | MAA (g) | EC-25 (g) | CTA: t-DDM (pph) | Water (g) | Hydrocarbon Resin: P100 (pph) |
| CE 4 | 85 | 0 | 8 | 5 | 2 | 1 | 0 | 100 | 0 |
| 6 | 80 | 5 | 8 | 5 | 2 | 1 | 0.009 | 102.5 | 2.5 |
| 7 | 72.5 | 12.5 | 8 | 5 | 2 | 1 | 0.018 | 105 | 5 |
| 8 | 65 | 20 | 8 | 5 | 2 | 1 | 0.009 | 107.5 | 7.5 |
| 9 | 65 | 20 | 8 | 5 | 2 | 1 | 0.027 | 107.5 | 7.5 |
| 10 | 80 | 5 | 8 | 5 | 2 | 1 | 0.009 | 107.5 | 7.5 |
| 11 | 65 | 20 | 8 | 5 | 2 | 1 | 0.009 | 102.5 | 2.5 |
| 12 | 65 | 20 | 8 | 5 | 2 | 1 | 0.027 | 102.5 | 2.5 |
| 13 | 72.5 | 12.5 | 8 | 5 | 2 | 1 | 0.036 | 105 | 5 |
| 14 | 72.5 | 12.5 | 8 | 5 | 2 | 1 | 0.018 | 110 | 10 |
| 15 | 80 | 5 | 8 | 5 | 2 | 1 | 0.027 | 102.5 | 2.5 |
| CE 5 | 72.5 | 12.5 | 8 | 5 | 2 | 1 | 0.018 | 100 | 0 |
| 16 | 80 | 5 | 8 | 5 | 2 | 1 | 0.027 | 107.5 | 7.5 |
| 17 | 60 | 25 | 8 | 5 | 2 | 1 | 0.018 | 105 | 5 |
| 18 | 72.5 | 12.5 | 8 | 5 | 2 | 1 | 0 | 105 | 5 |

* pph: parts per one hundred parts total monomer

TABLE 4

| Results | | | | | | | |
|---|---|---|---|---|---|---|---|
| Ex. No. | High Tg nonionic monomer: IBOA (g) | CTA: t-DDM (pph) | Hydrocarbon Resin: P100 (pph) | Tg (° C.) | Glass Peel Adhesion (oz/in; N/cm) | LDPE - 3 Days Dwell Peel Adhesion (oz/in; N/cm) | Holding Power on LDPE (min) |
| CE 4 | 0 | 0 | 0 | −44.1 | 15.4; 1.69 | 4.2; 0.42 | 11 |
| 6 | 5 | 0.009 | 2.5 | −37.5 | 25.9; 2.83 | 7.8; 0.85 | 58 |

TABLE 4-continued

| Results | | | | | | | |
|---|---|---|---|---|---|---|---|
| Ex. No. | High Tg nonionic monomer: IBOA (g) | CTA: t-DDM (pph) | Hydrocarbon Resin: P100 (pph) | Tg (° C.) | Glass Peel Adhesion (oz/in; N/cm) | LDPE - 3 Days Dwell Peel Adhesion (oz/in; N/cm) | Holding Power on LDPE (min) |
| 7 | 12.5 | 0.018 | 5 | −29 | 30.7; 3.36 | 11.8; 1.29 | 913 |
| 8 | 20 | 0.009 | 7.5 | −22.4 | 33.5; 3.67 | 11.6; 1.27 | 3618 |
| 9 | 20 | 0.027 | 7.5 | −19.6 | 36.8; 4.08 | 10.5; 1.15 | 6915 |
| 10 | 5 | 0.009 | 7.5 | −34.6 | 19.6; 2.15 | 9.2; 1.01 | 1053 |
| 11 | 20 | 0.009 | 2.5 | −21.4 | 36.0; 3.94 | 6.8; 0.74 | 39 |
| 12 | 20 | 0.027 | 2.5 | −21.4 | 43.2; 4.73 | 7; 0.77 | 620 |
| 13 | 12.5 | 0.036 | 5 | −29.9 | 32.3; 3.54 | 9.5; 1.04 | 723 |
| 14 | 12.5 | 0.018 | 10 | −26.1 | 26.9; 2.94 | 10.1; 1.11 | 6565 |
| 15 | 5 | 0.027 | 2.5 | −37.6 | 27.3; 2.99 | 7.1; 0.78 | 92 |
| CE 5 | 12.5 | 0.018 | 0 | −31.8 | 32.5; 3.56 | 4.7; 0.51 | 62.5 |
| 16 | 5 | 0.027 | 7.5 | −37.5 | 25.7; 2.81 | 10.7; 1.17 | 2152 |
| 17 | 25 | 0.018 | 5 | −17.7 | 37.4; 4.09 | 9.1; 1.00 | 2010 |
| 18 | 12.5 | 0 | 5 | −28.9 | 16.8; 1.84 | 10.1; 1.11 | 394 |

The above examples demonstrate the usefulness of the hydrocarbon resin, chain transfer agent (CTA: t-DDM), and high Tg nonionic monomer (IBOA) in improving peel adhesion strength on both glass and an LSE substrate, as represented by LDPE, as well as the holding power. Examples 6, 7, and 9 compared to CE4 are representatives of this.

The hydrocarbon resin plays a significant role in improving the holding power on LDPE in the presence of IBOA and t-DDM as shown by examples 7 and 14 compared to CE 5. Examples 7 vs. 17 demonstrate the significance of IBOA, while other factors are constant, in increasing the adhesion to glass and holding power on LDPE. Examples 6 vs. 15 and 11 vs. 12 demonstrate the significance of t-DDM, while other factors are constant, in increasing the adhesion to glass and holding power on LDPE.

Comparative Examples 6 (CE 6)

Comparative Example 6 having no hydrocarbon resin was prepared using "Emulsion Polymer Synthesis A" described above. The resulting emulsion had percent solids of approximately 50% by weight. This was used to prepare adhesive tapes (Method B) for evaluation of 180 degree angle peel adhesion strength (Method D: Painted Substrate). The composition and results are shown in Tables 5 and 6 below.

Examples 19-33

Examples 19-33 having hydrocarbon resin were prepared using "Emulsion Polymer Synthesis B" described above. Hydrocarbon resin was added in the amount shown as parts per hundred (pph) of total monomer. The resulting emulsions had percent solids of approximately 50% by weight. These were used to prepare adhesive tapes using Method B and evaluated for 180 degree angle peel adhesion strength (Method D: Painted Substrate, Paint 1). The compositions and results are shown in Tables 5 and 6 below.

TABLE 5

| Compositions | | | | | | | | | |
|---|---|---|---|---|---|---|---|---|---|
| | | | | | | CTA | | | Hydrocarbon |
| Ex. No. | IOA (g) | DMAEA-MCL (g solids) | VA (g) | MAA (g) | EC-25 (g) | CBr4 (pph) | PTMP (pph) | Water (g) | Resin: W10 (pph) |
| CE 6 | 85 | 8 | 5 | 2 | 1 | 0 | 0 | 100 | 0 |
| 19 | 85 | 8 | 5 | 2 | 1 | 0 | 0 | 105 | 5 |
| 20 | 85 | 8 | 5 | 2 | 1 | 0 | 0 | 110 | 10 |
| 21 | 85 | 8 | 5 | 2 | 1 | 0 | 0 | 115 | 15 |
| 22 | 85 | 8 | 5 | 2 | 1 | 0.02 | 0 | 105 | 5 |
| 23 | 85 | 8 | 5 | 2 | 1 | 0.02 | 0 | 110 | 10 |
| 24 | 85 | 8 | 5 | 2 | 1 | 0.02 | 0 | 115 | 15 |
| 25 | 85 | 8 | 5 | 2 | 1 | 0.03 | 0 | 105 | 5 |
| 26 | 85 | 8 | 5 | 2 | 1 | 0.03 | 0 | 110 | 10 |
| 27 | 85 | 8 | 5 | 2 | 1 | 0.03 | 0 | 115 | 15 |
| 28 | 85 | 8 | 5 | 2 | 1 | 0 | 0.03 | 105 | 5 |
| 29 | 85 | 8 | 5 | 2 | 1 | 0 | 0.03 | 110 | 10 |
| 30 | 85 | 8 | 5 | 2 | 1 | 0 | 0.03 | 115 | 15 |
| 31 | 85 | 8 | 5 | 2 | 1 | 0 | 0.044 | 105 | 5 |
| 32 | 85 | 8 | 5 | 2 | 1 | 0 | 0.044 | 110 | 10 |
| 33 | 85 | 8 | 5 | 2 | 1 | 0 | 0.044 | 115 | 15 |

* pph: parts per one hundred parts total monomer

TABLE 6

| Results | | | | |
|---|---|---|---|---|
| Ex. | Hydrocarbon Resin: W10 | CTA | | Paint 1 Peel Adhesion |
| No. | (pph) | $CBr_4$ (pph) | PTMP (pph) | (oz/in; N/cm) |
| CE 6 | 0 | 0 | 0 | 2.7; 0.3 |
| 19 | 5 | 0 | 0 | 5.6; 0.61 |
| 20 | 10 | 0 | 0 | 8.8; 0.96 |
| 21 | 15 | 0 | 0 | 8.9; 0.97 |
| 22 | 5 | 0.02 | 0 | 7.3; 0.8 |
| 23 | 10 | 0.02 | 0 | 10.4; 1.14 |
| 24 | 15 | 0.02 | 0 | 15.4; 1.69 |
| 25 | 5 | 0.03 | 0 | 8.4; 0.92 |
| 26 | 10 | 0.03 | 0 | 9.3; 1.02 |
| 27 | 15 | 0.03 | 0 | 10.6; 1.16 |
| 28 | 5 | 0 | 0.03 | 8.8; 0.96 |
| 29 | 10 | 0 | 0.03 | 9.7; 1.06 |
| 30 | 15 | 0 | 0.03 | 7.8; 0.85 |
| 31 | 5 | 0 | 0.044 | 10.1; 1.11 |
| 32 | 10 | 0 | 0.044 | 12.2; 1.34 |
| 33 | 15 | 0 | 0.044 | 14.0; 1.53 |

The Examples shown in Tables 5 and 6 exemplify the use of a liquid hydrocarbon resin, W10, to improve peel adhesion strength to a durable and dirt resistant paint.

Comparative Examples 7 to 9 (CE 7 to CE 9)

Comparative Examples 7, 8, and 9 having no hydrocarbon resin were prepared using "Emulsion Polymer Synthesis A"

described above. The resulting emulsion had percent solids of approximately 50% by weight. These emulsions were used to prepare adhesive tapes using Method A and evaluated for 180 degree angle peel adhesion strength (Methods A, B, and D). The adhesive coating weights were determined to be 36 grams/square meter. The compositions and results are shown in Tables 7 and 8 below.

Examples 34 and 35

Examples 34 and 35 having hydrocarbon resin were prepared using "Emulsion Polymer Synthesis B" described above. Hydrocarbon resin was added in the amount shown as parts per hundred (pph) of total monomer. The resulting emulsions had percent solids of approximately 50% by weight. These emulsions were used to prepare adhesive tapes using Method A and evaluated for 180 degree angle peel adhesion strength (Methods A, B, and D). The adhesive coating weights were determined to be 36 grams/square meter. The compositions and results are shown in Tables 7 and 8 below.

TABLE 7

| Compositions | | | | | | | | |
|---|---|---|---|---|---|---|---|---|
| Ex. No. | IOA (g) | C12 Acrylate (g) | DMAEA-MCL (g solids) | VA (g) | MAA (g) | EC-25 (g) | Water (g) | Hydrocarbon Resin: W10 (pph) |
| CE 7 | 85 | 0 | 8 | 5 | 2 | 1 | 100 | 0 |
| CE 8 | 42.5 | 42.5 | 8 | 5 | 2 | 1 | 100 | 0 |
| 34 | 42.5 | 42.5 | 8 | 5 | 2 | 1 | 103 | 3 |
| CE 9 | 0 | 85 | 8 | 5 | 2 | 1 | 115 | 0 |
| 35 | 0 | 85 | 8 | 5 | 2 | 1 | 105 | 3 |

TABLE 8

| Results | | | | | | |
|---|---|---|---|---|---|---|
| Ex. No. | C12 Acrylate (g) | Hydrocarbon Resin: W10 (pph) | Glass Peel Adhesion (oz/in; N/cm) | LDPE Peel Adhesion (oz/in; N/cm) | Paint 2 Peel Adhesion (oz/in; N/cm) | Paint 1 Peel Adhesion (oz/in; N/cm) |
| CE 7 | 0 | 0 | 37.3; 4.08 | 16.0; 1.75 | 19.0; 2.08 | 5.9; 0.65 |
| CE 8 | 42.5 | 0 | 30.6; 3.35 | 16.1; 1.76 | 18.7; 2.05 | 7.4; 0.81 |
| 34 | 42.5 | 3 | 27.0; 2.96 | 17.0; 1.86 | 19.3; 2.11 | 9.4; 1.03 |
| CE 9 | 85 | 0 | 28.0; 3.06 | 18.0; 1.97 | 17.5; 1.92 | 10.0; 1.09 |
| 35 | 85 | 3 | 25.4; 2.78 | 18.5; 2.02 | 21.4; 2.34 | 11.9; 1.30 |

Comparative Example 7 shows a significant difference in the peel adhesion values between the Glass, the highest, and Paint 1, the lowest with over a 30 oz/in difference. The results in Table 8 show the benefit of using the C12 Acrylate and Hydrocarbon Resin in lowering the Glass peel adhesion strength while improving LPDE and Paints 1 and 2 peel adhesion strengths, which narrowed the range between the highest and lowest substrate peel adhesion values. For instance, Example 35 exhibits a range of 13.5 oz/in between its' Glass and Paint 1 peel adhesion values.

Comparative Examples 10 to 12 (CE 10 to CE 12)

Comparative Example 10 to 12 having no hydrocarbon resin were prepared using "Emulsion Polymer Synthesis A" described above. The resulting emulsion had percent solids of approximately 50% by weight. These emulsions were used to prepare adhesive tapes using Method A and evaluated for 180 degree angle peel adhesion strength (Methods A, B, and D). The adhesive coating weights were determined to be 28 grams/square meter. The composition and results are shown in Tables 9 and 10 below.

Examples 36-39

Examples 36-39 having hydrocarbon resin were prepared using "Emulsion Polymer Synthesis B" described above. Hydrocarbon resin was added in the amount shown as parts per hundred (pph) of total monomer. The resulting emulsions had percent solids of approximately 50% by weight. These were used to prepare adhesive tapes using Method A and evaluated for 180 degree angle peel adhesion strength (Methods A, B, and D). The adhesive coating weights were determined to be 28 grams/square meter. The compositions and results are shown in Tables 9 and 10 below.

The results in Table 10 show the benefit of using the C13 Acrylate, similar to C12 Acrylate, and Hydrocarbon Resin which results in a lowering of the Glass peel adhesion strengths and a narrowing of the range between the highest and lowest substrate peel adhesion values. For instance, Example 37 exhibits a range of 8.4 oz/in between its' Glass and Paint 1 peel adhesion values. A lesser amount of C13 Acrylate was needed compared to C12 Acrylate.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. This disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. An aqueous polymerizable pre-adhesive reaction mixture comprising:

water;

one or more cationic (meth)acrylate monomers that have alkyl ammonium functionality; and a dispersed phase comprising one or more low Tg nonionic monomers and one or more hydrocarbon tackifiers; wherein the low Tg nonionic monomers have a (meth)acryloyl group and have a Tg of no greater than 20° C. when homopolymerized.

2. The aqueous pre-adhesive reaction mixture of claim 1 wherein the hydrocarbon tackifier comprises a C5-based

TABLE 9

| Compositions | | | | | | | | |
|---|---|---|---|---|---|---|---|---|
| Ex. No. | IOA (g) | C13 Acrylate (g) | DMAEA-MCL (g solids) | VA (g) | MAA (g) | EC-25 (g) | Water (g) | Hydrocarbon Resin: W10 (pph) |
| CE 10 | 85 | 0 | 8 | 5 | 2 | 1 | 100 | 0 |
| CE 11 | 72.5 | 12.75 | 8 | 5 | 2 | 1 | 100 | 0 |
| 36 | 72.5 | 12.75 | 8 | 5 | 2 | 1 | 103 | 3 |
| 37 | 72.5 | 12.75 | 8 | 5 | 2 | 1 | 106 | 6 |
| CE 12 | 63.75 | 21.25 | 8 | 5 | 2 | 1 | 100 | 0 |
| 38 | 63.75 | 21.25 | 8 | 5 | 2 | 1 | 103 | 3 |
| 39 | 63.75 | 21.25 | 8 | 5 | 2 | 1 | 106 | 6 |

TABLE 10

| Results | | | | | | |
|---|---|---|---|---|---|---|
| Ex. No. | C13 Acrylate (g) | Hydrocarbon Resin: W10 (pph) | Glass Peel Adhesion (oz/in; N/cm) | LDPE Peel Adhesion (oz/in; N/cm) | Paint 2 Peel Adhesion (oz/in; N/cm) | Paint 1 Peel Adhesion (oz/in; N/cm) |
| CE 10 | 0 | 0 | 34.8; 3.81 | 13.7; 1.50 | 17.8; 1.95 | 5.3; 1.47 |
| CE 11 | 12.75 | 0 | 25.2; 2.76 | 11.8; 1.29 | 13.5; 1.48 | 5.0; 0.55 |
| 36 | 12.75 | 3 | 20.1; 2.20 | 15.2; 1.66 | 13.4; 1.47 | 7.1; 0.78 |
| 37 | 12.75 | 6 | 16.8; 1.84 | 13.6; 1.49 | 12.2; 1.34 | 8.4; 0.92 |
| CE 12 | 21.25 | 0 | 24.1; 2.64 | 11.3; 1.24 | 13.4; 1.47 | 5.3; 0.58 |
| 38 | 21.25 | 3 | 17.3; 1.89 | 13.1; 1.43 | 11.6; 1.27 | 6.8; 0.74 |
| 39 | 21.25 | 6 | 15.7; 1.72 | 12.9; 1.41 | 11.7; 1.28 | 7.4; 0.81 |

hydrocarbon resin, a C9-based hydrocarbon resin, a C5/C9-based hydrocarbon resin, or a mixture thereof.

3. The aqueous pre-adhesive reaction mixture of claim 1 wherein the hydrocarbon tackifier comprises a hydrogenated hydrocarbon tackifier.

4. The aqueous pre-adhesive reaction mixture of claim 1 wherein the hydrocarbon tackifier is present in the pre-adhesive reaction mixture in an amount of 2 to 25 parts per one hundred parts of total monomers.

5. The aqueous pre-adhesive reaction mixture of claim 1 wherein the pre-adhesive reaction mixture further comprises one or more high Tg nonionic monomers having a (meth) acryloyl group and having a Tg of at least 30° C. when homopolymerized.

6. The aqueous pre-adhesive reaction mixture of claim 5 wherein the high Tg nonionic monomers comprise methyl methacrylate, ethyl methacrylate, n-propyl methacrylate, isopropyl methacrylate, n-butyl methacrylate, isobutyl methacrylate, sec-butyl methacrylate, tert-butyl (meth)acrylate, cyclohexyl methacrylate, isobornyl (meth)acrylate, stearyl (meth)acrylate, phenyl acrylate, benzyl methacrylate, 3,3,5 trimethylcyclohexyl (meth)acrylate, 2-phenoxyethyl methacrylate, or a mixture thereof.

7. The aqueous pre-adhesive reaction mixture of claim 5 wherein the one or more high Tg nonionic monomers are present in the pre-adhesive reaction mixture in an amount of 1 wt-% to 30 wt-%, based on the total weight of the monomers in the pre-adhesive reaction mixture.

8. The aqueous pre-adhesive reaction mixture of claim 1 wherein the pre-adhesive reaction mixture further comprises one or more chain transfer agents.

9. The aqueous pre-adhesive reaction mixture of claim 8 wherein the low Tg nonionic monomer comprises a non-tertiary alkyl (meth)acrylate with an alkyl group having 1 to 18 carbon atoms.

10. The aqueous pre-adhesive reaction mixture of claim 9 wherein the alkyl group has 8 to 14 carbon atoms.

11. A polymerized product of the aqueous reaction mixture of claim 1.

12. An adhesive composition comprising 80 wt-% to 98 wt-% of a cationic polymer having cationic monomeric units and optional anionic monomer units separate from the cationic monomeric units and 2 wt-% to 20 wt-% of a hydrocarbon tackifier, based on the total weight of the cationic polymer plus the hydrocarbon tackifier, wherein the cationic monomeric units have an alkyl ammonium functionality.

13. The adhesive composition of claim 12 wherein the cationic polymer comprises:

2 wt-% to 45 wt-%, based on the total weight of monomeric units, of one or more cationic monomeric units derived from a (meth)acrylate ester having an alkyl ammonium functionality, or a mixture of two or more thereof;

10 wt-% to 98 wt-%, based on the total weight of monomeric units, of one or more low Tg nonionic monomeric units derived from a low Tg nonionic monomer having a (meth)acryloyl group and having a Tg no greater than 20° C. when homopolymerized, or a mixture of two or more thereof;

0 wt-% to 30 wt-%, based on the total weight of monomeric units, of one or more optional monomeric units comprising a) one or more high Tg nonionic monomeric units derived from a high Tg nonionic monomer having a (meth)acryloyl group and having a Tg of at least 30° C. when homopolymerized, b) one or more polar monomeric units derived from a polar monomer having a hydroxyl group, primary amido group, secondary amido group, a tertiary amido group, an amino group, an ether group, or an epoxy group, c) one or more vinyl monomeric units derived from a vinyl monomer that is free of a (meth)acryloyl group, or d) a mixture of two or more thereof;

0 wt-% to 10 wt-%, based on the total weight of monomeric units, of one or more crosslinking monomeric units; and 0 wt-% to 5 wt-%, based on the total weight of monomeric units, of one or more anionic monomeric units derived from acrylic acid, methacrylic acid, a carboxylate salt monomer, or a mixture of two or more thereof, wherein the amount of carboxylate salt is determined, based on the weight of the corresponding free acid.

14. The adhesive composition of claim 13 wherein the hydrocarbon tackifier comprises a CS-based hydrocarbon resin, a C9-based hydrocarbon resin, a C5/C9-based hydrocarbon resin, or a mixture thereof.

15. An adhesive article comprising a support having first and second opposed major surfaces, and an adhesive composition of claim 13 disposed on at least a portion of at least one of the first and second opposed major surfaces.

* * * * *

UNITED STATES PATENT AND TRADEMARK OFFICE

CERTIFICATE OF CORRECTION

PATENT NO. : 11,649,378 B2
APPLICATION NO. : 16/465160
DATED : May 16, 2023
INVENTOR(S) : Ibrahim A El-Hedok et al.

It is certified that error appears in the above-identified patent and that said Letters Patent is hereby corrected as shown below:

In the Claims

Column 52
Line 39 (approx.), In Claim 14, delete “CS-based” and insert -- C5-based --, therefor.

Signed and Sealed this
Twelfth Day of September, 2023

Katherine Kelly Vidal

Katherine Kelly Vidal
*Director of the United States Patent and Trademark Office*